United States Patent
Ideguchi et al.

(10) Patent No.: US 12,387,293 B2
(45) Date of Patent: Aug. 12, 2025

(54) IMAGE GENERATING APPARATUS GENERATING IMAGE OF SAMPLE WHILE IRRADIATING LIGHT TO THE SAMPLE AND IMAGE GENERATING METHOD

(71) Applicants: THE UNIVERSITY OF TOKYO, Tokyo (JP); OSAKA UNIVERSITY, Osaka (JP)

(72) Inventors: Takuro Ideguchi, Tokyo (JP); Keiichiro Toda, Tokyo (JP); Miu Tamamitsu, Tokyo (JP); Kazuki Hashimoto, Tokyo (JP); Ryoichi Horisaki, Osaka (JP)

(73) Assignees: THE UNIVERSITY OF TOKYO, Tokyo (JP); OSAKA UNIVERSITY, Osaka (JP)

( * ) Notice: Subject to any disclaimer, the term of this patent is extended or adjusted under 35 U.S.C. 154(b) by 213 days.

(21) Appl. No.: 17/260,185

(22) PCT Filed: Jul. 12, 2019

(86) PCT No.: PCT/JP2019/027754
§ 371 (c)(1),
(2) Date: Apr. 4, 2022

(87) PCT Pub. No.: WO2020/013325
PCT Pub. Date: Jan. 16, 2020

(65) Prior Publication Data
US 2023/0010572 A1  Jan. 12, 2023

(30) Foreign Application Priority Data
Jul. 13, 2018 (JP) .................... 2018-133711

(51) Int. Cl.
*G06T 5/50* (2006.01)
*G01N 21/3563* (2014.01)
(Continued)

(52) U.S. Cl.
CPC ........... *G06T 5/50* (2013.01); *G01N 21/3563* (2013.01); *G02B 21/367* (2013.01); *H04N 23/56* (2023.01);
(Continued)

(58) Field of Classification Search
CPC ............ G06T 5/50; G06T 2207/10048; G06T 2207/10056; G06T 2207/10152;
(Continued)

(56) References Cited

U.S. PATENT DOCUMENTS

2004/0085540 A1*  5/2004  Lapotko ............... G01N 21/171
                                                          356/432
2015/0036145 A1   2/2015  Cichos et al.
(Continued)

FOREIGN PATENT DOCUMENTS

CN  106331442 A   1/2017
CN  106461558 A   2/2017
(Continued)

OTHER PUBLICATIONS

Miyazaki et al., "Resolution improvement in laser diode-based pump-prope microscopy with an annular pupil filter", Optics Letters vol. 39 No. 14, Jul. 15, 2014 {Included in IDS}.*
(Continued)

Primary Examiner — James T Boylan
(74) Attorney, Agent, or Firm — CANTOR COLBURN LLP

(57) ABSTRACT

Irradiation light in a visible light region is irradiated to a sample while switching irradiation of infrared light IR having a wavelength that corresponds to the infrared absorption spectrum of an observation target material included in the sample between a first state and a second state. A first image and a second image are generated based on the phase distribution, the intensity distribution, and the polarization
(Continued)

direction distribution of the light including the irradiation light that has passed through the sample in synchronization with the switching of the infrared light R irradiation between the first state and the second state. Subsequently, an output image is generated so as to represent one from among the position, size, and shape based on the difference and/or ratio with respect to the pixel values for each pixel between the first image and the second image.

10 Claims, 24 Drawing Sheets

(51) Int. Cl.
  *G02B 21/36* (2006.01)
  *H04N 23/56* (2023.01)
(52) U.S. Cl.
  CPC ........... *G06T 2207/10048* (2013.01); *G06T 2207/10056* (2013.01); *G06T 2207/10152* (2013.01); *G06T 2207/20224* (2013.01); *G06T 2207/30024* (2013.01)
(58) Field of Classification Search
  CPC ........... G06T 2207/20224; G06T 2207/30024; H04N 23/56; G01N 21/3563; G02B 21/367
  See application file for complete search history.

(56) References Cited

U.S. PATENT DOCUMENTS

| | | | | |
|---|---|---|---|---|
| 2017/0211977 A1* | 7/2017 | Jeys | ................. | G01J 3/447 |
| 2017/0299371 A1* | 10/2017 | Cotte | ................. | G03H 1/0866 |
| 2017/0302826 A1* | 10/2017 | Lenigk | ................. | G01J 5/10 |
| 2018/0246032 A1* | 8/2018 | Li | ................. | G01J 3/2823 |
| 2020/0025677 A1* | 1/2020 | Prater | ................. | G01J 3/427 |
| 2020/0348182 A1* | 11/2020 | Cheng | ................. | G01J 3/2889 |
| 2021/0215601 A1* | 7/2021 | Prater | ................. | C12M 41/36 |
| 2023/0063843 A1* | 3/2023 | Prater | ................. | G01J 3/2823 |
| 2023/0236112 A1* | 7/2023 | Prater | ................. | G01J 3/2823 356/451 |

FOREIGN PATENT DOCUMENTS

| | | |
|---|---|---|
| JP | 5-21078 A | 9/1993 |
| JP | 2005/195801 A | 7/2005 |
| JP | 2013-183108 A | 9/2013 |
| WO | WO 2006/085606 A1 | 8/2006 |
| WO | 2018102467 A1 | 6/2018 |
| WO | WO 2020/013325 | 1/2020 |

OTHER PUBLICATIONS

Vasudevan et al. "Quantitative photothermal phase imaging of red blood cells using digital holographic photothermal microscope", Applied Optics, vol. 54, No. 14, May 10, 2015.*
Zhang et al. "Bond-selective transient phase imaging via sensing of the infrared photothermal effect", Light: Science & Applications, 2019.*
EPO Extended European Search Report for corresponding EP Application No. 19835002.7; Dated on Feb. 18, 2022.
International Preliminary Report on Patentability from PCT Application PCT/JP2019/027754, dated Jan. 19, 2021, 9 pgs, with English translation.
English translation of International Search Report for PCT Application PCT/JP2019/027754, dated Sep. 30, 2019, 2 pgs.
Miyazaki, Jun, Kawasumi, Koshi, Kobayashi, Takayoshi, "Resolution improvement in laser diode-based pump-probe microscopy with an annular pupil filter", Optics Letters, Jul. 15, 2014, vol. 39, No. 14, 4219-4222.
Miyazaki, Jun, Tsurui, Hiromichi, Kanabuki, Koshi, Kobayashi, Takayoshi, "Optimal detection angel in sub-diffraction resolution photothermal microscopy: application for high sensitivity imaging of biological tissues", Optics Express, vol. 22, No. 16, Jul. 28, 2014, 18833-18842.
Miyazaki, Jun, Tsurui, Hiromichi, Hayashi-Takagi, Akiko, Kasai, Haruo, Kobayashi, Takayoshi, "Sub-diffraction resolution pump-probe microscopy with shot-noise limited sensitivity using laser diodes", Optics Express, vol. 22, No. 8, Apr. 7, 2014, 9024-9032.
Delong Zhang, Chen Li, Chi Zhang, Mikhail N. Slipchenko, Gregory Eakins, Jo-Xin Cheng "Depth-resolved mid-infrared photothermal imaging of living cells and organisms with submicrometer spatial resolution" Science advances vol. 2, No. 9, e1600521 (Sep. 2016).
CNIPA Notification of First Office Action for corresponding CN Application No. 201980046780.4; Mailed on Jun. 29, 2022.
CNIPA Second Office Action for corresponding CN Application No. 201980046780.4; Issued on Apr. 24, 2023.
EPO Communication pursuant to Article 94(3) EPC; Issued in Oct. 24, 2023.

* cited by examiner

IRRADIATION AREA OF INFRARED LIGHT (20 mW) HAVING WAVELENGTH OF 9.56 μm

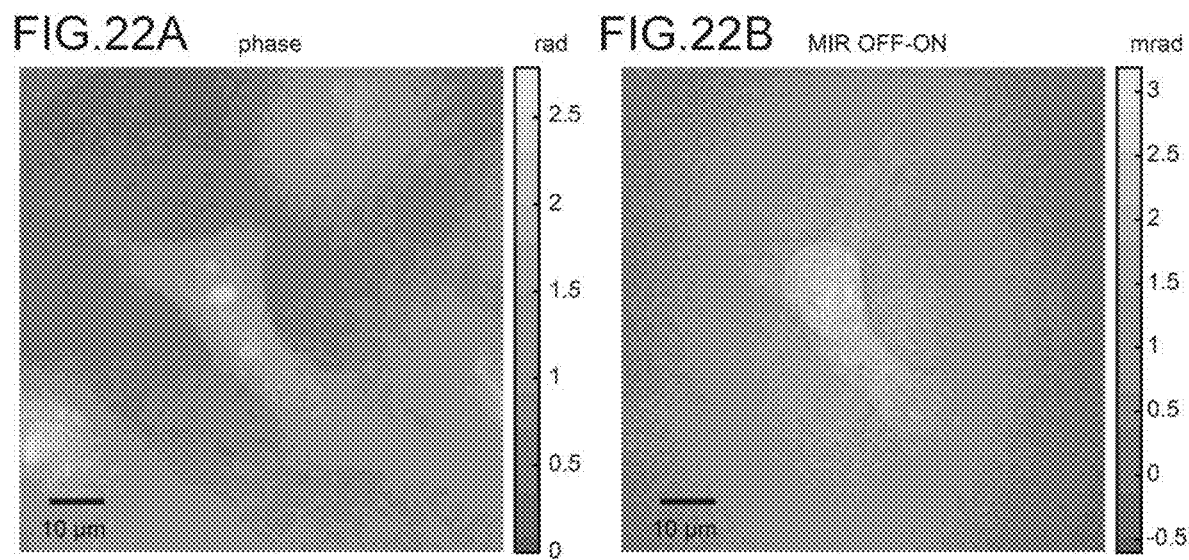

IMAGE GENERATING APPARATUS GENERATING IMAGE OF SAMPLE WHILE IRRADIATING LIGHT TO THE SAMPLE AND IMAGE GENERATING METHOD

BACKGROUND

1. Technical Field

The present disclosure relates to an image generating apparatus or the like that generates a two-dimensional or three-dimensional image of a sample while irradiating light to the sample.

2. Description of the Related Art

In recent years, in life science fields such as pharmacology, biotechnology, etc., it has become more important to conduct non-invasive observation of specific molecules so as to obtain information with respect to when and where the specific molecules exhibit their functions and what kinds of other molecules have a relation with the specific molecules exhibiting their functions, without altering cells employed as a specimen (sample).

However, it is difficult for an ordinary optical microscope to obtain information other than a shape with respect to such a kind of biological sample. That is to say, it is difficult to allow the user (observer) to visualize or form an image of the internal structure thereof or the behavior of molecules included in the sample.

In order to solve such a problem, as a conventional method for visually observing a colorless and transparent observation target material (e.g., a predetermined protein, desoxyribonucleic acid (DNA), etc.) in a sample, a fluorescence imaging method is employed.

With the fluoroscopic imaging, a method is employed in which a fluorescent probe (e.g., organic pigment, quantum dot, etc.) having the nature of so-called fluorescence, which is the emission of light having a different wavelength in response to excitation light having a particular wavelength, is introduced into a sample such that it reacts and couples with bioactive molecules in cells to be observed. Subsequently, by detecting the fluorescence irradiated from the probe, this method allows a spatial distribution of the bioactive molecule target to be indirectly visualized.

However, in such a case in which such a fluorescent probe is introduced into a biological sample such as cells or the like, such a method has the potential to cause disturbance due to the probe (e.g., cell death or the like in the biological sample due to toxicity of the fluorescent probes), leading to alteration of the biological sample from the original state. That is to say, this leads to difficulty in observing the original state of the sample.

Furthermore, such a fluorescent probe has the nature of color degradation that occurs after a period on the order of several minutes after the excitation light is irradiated. Accordingly, this method is unsuitable for prolonged observation (e.g., stem cell differentiation, drug penetration observation, etc.).

In addition, with such a method using the fluorescent probe, there is a need to prepare a different kind of probe for each bioactive molecule to be observed. However, only limited kinds of available fluorescent probes in practical use are known. Accordingly, only limited kinds of bioactive molecules can be observed.

In order to solve such a problem, in recent years, an infrared spectroscopic imaging technique (Patent document 1, for example) or a Raman spectroscopic imaging technique (Patent document 2, for example) has been put to practical use as a labeling-free imaging technique that allows the observation-target molecular vibration of the bioactive molecules to be visually observed without using such a fluorescent probe.

In particular, with the infrared spectroscopic imaging technique, infrared light that resonates with the molecular vibration of the target molecules is irradiated to a sample such as a living organism or the like, so as to cause absorption of the energy of the irradiated infrared light due to the target molecules. By detecting the transmission coefficient and the reflection coefficient of the infrared light, this allows the spatial distribution and concentration of the molecules to be visually observed in a quantitative manner.

With this method, by scanning the wavelength of the irradiated infrared light or the like, this allows a wider range of (i.e., various kinds of) molecular vibration to be scanned and identified. Furthermore, this allows the infrared light absorption due to molecular vibration resonance to be detected with high sensitivity.

Furthermore, this method provides high detection sensitivity with respect to the molecular vibration of the target molecules, thereby allowing the observation target molecules to be detected with high sensitivity as compared with Raman spectroscopic imaging.

However, with the infrared spectroscopic imaging technique, the spatial distribution that can be detected depends on the wavelength of light employed. Accordingly, this provides spatial resolution on the order of only several m to several dozen m, which is diffraction limit of the infrared light.

In contrast, with the Raman spectroscopic imaging technique, a so-called Raman scattered light component, which is a light component having a wavelength shifted by the frequency of the molecular vibration from the wavelength of the light irradiated to a sample such as a living organism or the like, is detected. This allows the presence of the target molecules in the sample to be detected.

This method provides imaging using electromagnetic waves having a short wavelength as compared with infrared light. Accordingly, this provides a high spatial resolution on the order of several hundred nm.

However, the scattering cross-section of Raman scattering (i.e., the reciprocal of light density required to provide one Raman scattered photon from one molecule) is on the order of approximately $10^{-30}$ $cm^2$. That is to say, Raman scattering occurs with only low efficiency as compared with the absorption cross-section of typical fluorescent molecules, which is on the order of $10^{-16}$ $cm^2$. Accordingly, it is difficult for the Raman scattering technique to provide improved detection efficiency for the molecules to be observed.

Recently, an optical microscope has also been proposed that is configured to irradiate infrared light that corresponds to the absorption line of the observation target molecules to a sample at the same time as the irradiation of visible light laser for generating an image, so as to change the refractive index of the observation target molecules. By observing the change in the diffraction coefficient of the sample using the visible light, the optical microscope is capable of generating an image of the observation target bioactive molecules with high sensitivity and high resolution (e.g., Non-patent document 1).

RELATED ART DOCUMENTS LIST (1) Patent Documents

Patent document 1: Japanese Patent Application Laid Open No. H05-241078

Patent document 2: Japanese Patent Application Laid Open No. 2013-183108

(2) Non-Patent Documents

Non-patent document 1: Delong Zhang, Chen Li, Chi Zhang, Mikhail N. Slipchenko, Gregory Eakins, Jo-Xin Cheng "Depth-resolved mid-infrared photothermal imaging of living cells and organisms with submicrometer spatial resolution" Science advances Vol. 2, no. 9, e1600521 (September 2016)

However, with the apparatus described in Non-patent document 1 listed above, a two-dimensional image is formed by scanning a one-dimensional measurement point on a sample. Accordingly, in order to generate a two-dimensional image of (100×100) pixels, this requires the measurement of ten thousand measurement points, leading to difficulty in providing improved image acquisition speed.

SUMMARY

The present disclosure has been made in order to solve the problems described above.

An embodiment of the present invention relates to an image generating apparatus. The image generating apparatus includes: a stimulus input unit structured to irradiate stimulus input infrared light with a wavelength that resonates with an infrared absorption line of an observation target material included in a sample; a light source structured to generate irradiation light having a wavelength that is shorter than that of the stimulus input infrared light; an irradiation optical unit structured to irradiate the irradiation light to the sample; a control unit structured to switch irradiation of the stimulus input infrared light input by the stimulus input unit between a first state and a second state; a detection unit structured to detect at least one from among (1) a phase distribution, (2) an intensity distribution, and (3) a polarization direction distribution, with respect to at least one from among the irradiation light that has passed through the sample and the irradiation light reflected by the sample; and a generating unit structured to generate an output image that represents a property of the sample according to an output of the detection unit. The generating unit generates a first image based on the output of the detection unit in the first state and a second image based on the output of the detection unit in the second state. The generating unit calculates a difference and/or a ratio of a corresponding pixel between the first image and the second image. The generating unit generates the output image based on the difference and/or the ratio of the corresponding pixel between the first image and the second image.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 22A and 22B are diagrams showing measurement results with respect to a biological sample obtained by the image generating apparatus shown in FIG. 18;

DETAILED DESCRIPTION

Figure 1:
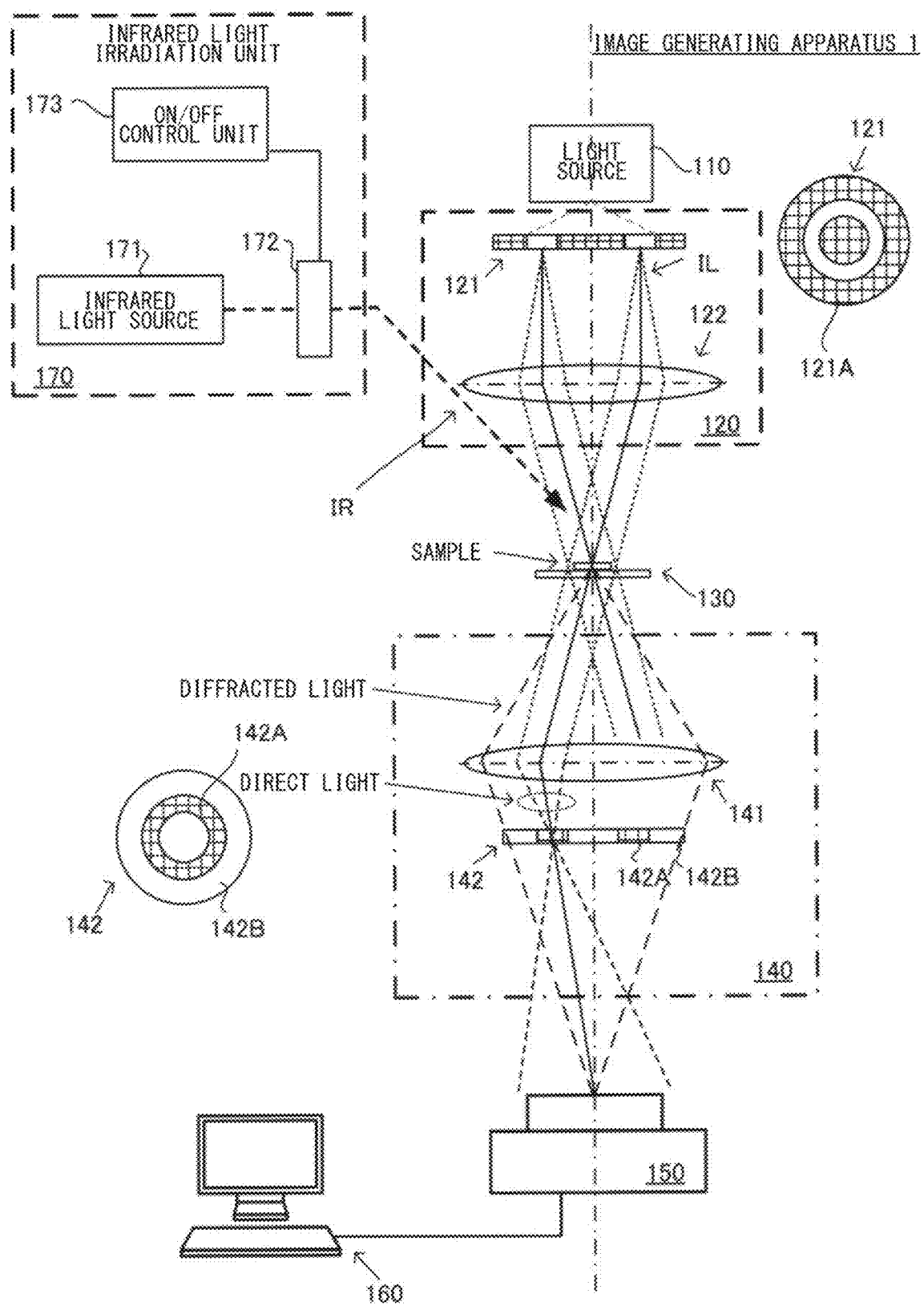
FIG. 1 is a block diagram showing a configuration of an image generating apparatus according to a first embodiment.

Description will be made below regarding embodiments of the present invention. It should be noted that description will be made in the following embodiments regarding an example in which an image generating apparatus or an image generating method according to the present invention is applied to an optical microscope configured to generate a two-dimensional or three-dimensional image of a colorless and transparent biological sample such as cells or the like. Furthermore, the present embodiments are by no means intended to unduly restrict the content of the present invention described in the appended claims. That is to say, it is not necessarily essential for the present invention that all the components thereof be provided as described in the following embodiments.

OVERVIEW OF THE EMBODIMENTS (1) Several embodiments disclosed in the present specification relate to an image generating apparatus. The image generating apparatus includes: a stimulus input unit structured to irradiate stimulus input infrared light with a wavelength that resonates with an infrared absorption line of an observation target material included in a sample; a light source structured to generate irradiation light having a wavelength that is shorter than that of the stimulus input infrared light; an irradiation optical unit structured to irradiate the irradiation light to the sample; a control unit structured to switch irradiation of the stimulus input infrared light input by the stimulus input unit between a first state and a second state; a detection unit structured to detect at least one from among (1) a phase distribution, (2) an intensity distribution, and (3) a polarization direction distribution, with respect to at least one from among the irradiation light that has passed through the sample and the irradiation light reflected by the sample; and a generating unit structured to generate an output image that represents a property of the sample according to an output of the detection unit. The generating unit generates a first image based on the output of the detection unit in the first state and a second image based on the output of the detection unit in the second state. The generating unit calculates a difference and/or a ratio of a corresponding pixel between the first image and the second image. The generating unit generates the output image based on the difference and/or the ratio of the corresponding pixel between the first image and the second image.

This arrangement is capable of visualizing molecular information with respect to the observation target material included in the sample in the form of an image in a non-invasive manner.

Typically, upon receiving the irradiation of the stimulus input infrared light that corresponds to the infrared absorption line of the observation target material included in the sample, molecular vibration absorption occurs in the observation target material. This changes the physical properties such as the refractive index, shape, transmissivity, reflectance, etc., due to photothermal effects.

Accordingly, in a case in which the stimulus input infrared light to be irradiated to the sample is switched between the two states, the two images (the first image and the second image) acquired in the two states reflect the change in the stimulus input infrared light. Accordingly, by generating an image based on the difference or ratio of the corresponding pixels between the first image and the second image, such an arrangement allows the observation target material included in the sample to be selectively observed, and allows the absorption spectrum of the material to be investigated.

(1) According to an embodiment, in the first state, the stimulus input infrared light may be on. Also, in the second state, the stimulus input infrared light may be off.

In this case, when the stimulus input infrared light is irradiated to the sample (when the irradiation of the stimulus input infrared light to the sample is set to the on state (which will be referred to as an "on state" hereafter)), the change of the physical properties occurs only in molecules that have absorbed the stimulus input infrared light in a material included in the sample and/or a surrounding medium thereof.

That is to say, in the on state of the stimulus input infrared light, when the irradiation light is irradiated to the sample with a wavelength in at least one from among the near-infrared region, visible light region, and ultraviolet region that is shorter than that of the stimulus input infrared light, a change in phase, amplitude, or polarization state occurs in the irradiation light that has passed through the sample (which will be referred to as "transmitted light" hereafter) or the irradiation light that has been reflected by the sample (which will be referred to as "reflected light" hereafter). By detecting at least one from among the phase distribution, intensity distribution, and polarization direction distribution with respect to the transmitted light or the reflected light, this arrangement is capable of visualizing the position, concentration, size, or shape of the observation target material included in the sample in the form of an image.

Furthermore, the sample to be visualized as described above includes the observation target material. Basically, in a case in which the sample includes the observation target material, the sample image acquired in the on state of the stimulus input infrared light (which will be referred to as a "first image" or an "on image") also includes a pixel value component that corresponds to a material that differs from the observation target material.

However, by calculating the difference in the pixel value for each pixel between the on image and an image (which will be referred to as a "second image" or an "off image") generated by calculating the phase distribution, intensity distribution, or polarization direction distribution of the irradiation light (transmitted light) that has passed through the sample or the irradiation light (reflected light) that has been reflected by the sample in the off state in which the irradiation of the stimulus input infrared light to the sample is set to an off state (which will be also referred to as an "off state" hereafter), this arrangement is capable of removing the pixel value components due to the materials that differ from the observation target material.

Accordingly, with this embodiment, excitation (stimulus input) infrared light is irradiated so as to cause the occurrence of molecular vibration absorption in the observation target material included in the sample. This induces a change in the refractive index or the transmissivity of the observation target material. Furthermore, an on image and an off image are acquired using the irradiation light with a wavelength in at least one from among the near-infrared region, visible light region, and ultraviolet region that is shorter than that of the stimulus input infrared light. The on image and the off image are subjected to image processing. This allows the molecular information with respect to the observation target material included in the sample to be visualized in the form of an image in a non-invasive manner.

Furthermore, with this embodiment, the excitation light to be employed is configured as infrared light (i.e., stimulus input infrared light). Accordingly, such an arrangement requires only small light energy or a small light amount to support high-sensitivity molecular vibration imaging. It can be anticipated that this arrangement allows the occurrence of light damage in the sample due to the electron transmission process to be reduced as compared with Raman spectroscopic imaging and so on.

Furthermore, as the irradiation light, this arrangement employs light having a wavelength in at least one from among the near-infrared region, visible light region, and ultraviolet region that is shorter than that of the stimulus input infrared light. This arrangement provides a spatial resolution that is higher than that provided by infrared spectroscopic imaging. Specifically, this arrangement is capable of detecting two-dimensional information with respect to a target with a spatial resolution on the order of several hundred nm.

Furthermore, by supporting measurement based on an image forming optical system employing a lens system and a typical two-dimensional image sensor, such an arrangement is capable of acquiring a two-dimensional image or a three-dimensional image. Furthermore, by providing two-dimensional or three-dimensional image generation with respect to the observation target material with an improved image-generating speed, such an arrangement allows the detection sensitivity per unit time to be improved.

It should be noted that, in a case in which the image generating apparatus is configured as a super-resolution microscope, such an arrangement is capable of providing a spatial resolution on the order of several nm to several dozen nm. The spatial resolution depends on the wavelength. Accordingly, by employing the irradiation light having a wavelength on the order of several dozen nm, such an arrangement is capable of providing a spatial resolution on the order of from several dozen nm to several nm.

It should be noted that the method for generating the on image and the off image based on at least one from among (1) phase distribution, (2) intensity distribution, and (3) polarization direction distribution of at least one from among the irradiation light that has passed through the sample and the irradiation light that has been reflected by the sample is not restricted in particular.

For example, in the same way as with conventional phase contrast microscopes, differential interference microscopes, digital holographic microscopes, bright-field and dark-field microscopes, polarization interferometers, etc., the sample image acquired via an optical system using an appropriate mechanism configured to be capable of detecting the distribution of physical properties of the light may be formed on a two-dimensional detector (Charge-Coupled Device (CCD), Complementary Metal-Oxide-Semiconductor (CMOS) image sensor, or the like), so as to acquire the on image and the off image.

In addition to the configuration described above, the light path from the sample up to the detection unit may be formed of a material that does not involve absorption of the infrared light that resonates with the molecular vibration that occurs in the observation target material.

For example, such an arrangement is capable of preventing the occurrence of modulation of the physical properties such as the phase or the like in the irradiation light that has passed through the sample or in the reflected light that has been reflected by the sample due to the occurrence of absorption of the infrared light in the light path from the sample up to the detection unit. This allows the occurrence of noise to be prevented in the output image thus generated.

Examples of components provided between the sample up to the detection unit include a slide glass, objective lens, etc., as described later.

Furthermore, the infrared region includes an absorption line of water included in the air. Accordingly, in order to reduce the effects of infrared light absorption on the generated image due to the water included in the air, the light path from the sample up to the detection unit is preferably purged with a material such as nitrogen gas or the like, so as to provide a state in which there is no water molecules in the atmosphere of the light path.

Specifically, a desired method may be employed for purging the light path with nitrogen gas or the like in order to remove water molecules included in the light path. For example, the air may be removed from the space of the light path in an airtight state while injecting nitrogen gas to the light path, thereby removing water molecules in the atmosphere of the light path.

(3) Also, the stimulus input unit may be structured to be capable of changing the wavelength of the stimulus input infrared light.

With this arrangement, even in a case in which there are multiple kinds of observation target materials, by irradiating the stimulus input infrared light with multiple different waveforms that correspond to the infrared absorption lines of the multiple kinds of materials, this arrangement is capable of visualizing, differentiating, and identifying each observation target material included in the sample.

It should be noted that the infrared absorption spectrums of each material are known in Fourier transform infrared spectroscopy (FTIR) or the like. Accordingly, the wavelength of the stimulus input infrared light to be irradiated to the sample may be set beforehand according to the absorption line that corresponds to the material to be observed. Also, the wavelength of the stimulus input infrared light may be continuously scanned in a predetermined range. Also, such an arrangement may employ an image with a wavelength that provides the most pronounced change between the on image and the off image.

(4) Also, there may be a difference in the intensity of the stimulus input infrared light between the first state and the second state. That is to say, the stimulus input unit may be configured to be capable of switching the stimulus input infrared light between first stimulus input infrared light having a first intensity and second stimulus input infrared light having the same wavelength as that of the first stimulus input infrared light and having a second intensity that differs from the first intensity.

With this arrangement, the first image and the second image are generated while repeatedly switching the intensity of the excitation infrared light to be irradiated to the sample from the stimulus input unit between the first intensity and the second intensity. By calculating the difference or ratio of the corresponding pixels between the first image and the second image, this arrangement is capable of removing the pixel components included in the first image that occur due to materials that differ from the observation target material.

This allows the observation target material included in the sample to be visualized in the form of an image in a non-invasive manner.

(5) Also, there may be a difference in the wavelength of the stimulus input infrared light between the first state and the second state. That is to say, the stimulus input unit may be configured to be capable of switching the stimulus input infrared light between first stimulus input infrared light having a first wavelength that resonates with an infrared absorption line of the observation target material included in the sample and second stimulus input infrared light having a second wavelength that differs from that of the first stimulus input infrared light.

With this arrangement, the first image and the second image are generated while repeatedly switching the waveform of the infrared light to be irradiated to the sample from the stimulus input unit between the first waveform and the second waveform. By calculating the difference and/or ratio of the corresponding pixels between the first image and the second image, this arrangement is capable of removing the pixel components included in the first image that occur due to materials that differ from the observation target material. This allows the observation target material included in the sample to be visualized in the form of an image in a non-invasive manner.

(6) Also, the detection unit may be provided at a position such that it faces the sample. Also, the detection unit may further include an objective lens structured to magnify a part of an image of the sample.

With this arrangement, an enlarged image of the sample including the observation target material can be generated as an output image. This arrangement provides the image generating apparatus having a function as an optical microscope.

It should be noted that the objective lens may be formed of a material that does not involve absorption of the infrared light that resonates with the molecular vibration that occurs in the observation target material as with the slide glass. Also, the objective lens may be formed of typical glass or another material.

(4) Also, in the present specification, an image generating method for generating a sample image is disclosed. The image generating method includes: irradiating a stimulus input infrared light to the sample with a wavelength that resonates with an infrared absorption line of an observation target material included in the sample, and switching a state of the stimulus input infrared light between a first state and a second state; irradiating irradiation light to the sample with a wavelength that is shorter than that of the stimulus input infrared light at the same time as the irradiation of the stimulus input infrared light; detecting at least one from among (1) phase distribution, (2) intensity distribution, and (3) polarization direction, with respect to at least one from among the irradiation light that has passed through the sample and the irradiation light reflected by the sample in the first state of the stimulus input infrared light, and generating a first image based on the detection result thereof; detecting at least one from among (1) the phase distribution, (2) the intensity distribution, and (3) the polarization direction distribution, with respect to at least one from among the irradiation light that has passed through the sample and the irradiation light reflected by the sample in the second state of the stimulus input infrared light, and generating a second image based on the detection result thereof; and calculating a difference and/or a ratio of a corresponding pixel between the first image and the second image, and generating an image of the sample based on the difference and/or the ratio of the corresponding pixel between the first image and the second image.

By irradiating the excitation infrared light (i.e., stimulus input infrared light) to the sample while irradiating the irradiation light with a wavelength in at least one from among the near-infrared region, visible light region, and ultraviolet region, this arrangement is capable of causing the occurrence of molecular vibration absorption of the infrared light energy due to the observation target material. This allows the refractive index, shape, transmissivity, or the like, of the observation target material to be changed in a sure manner. Accordingly, this arrangement allows the molecular information with respect to the observation target material included in the sample to be visualized in the form of an image in a non-invasive manner.

[1] First Embodiment

[1.1] Configuration

First, description will be made with reference to FIG. 1 regarding a configuration of an image generating apparatus 1 according to a first embodiment of the present invention. It should be noted that FIG. 1 is a block diagram showing the configuration of the image generating apparatus 1 according to the present embodiment. The image generating apparatus 1 will be referred to as an "infrared photothermal phase contrast microscope".

The image generating apparatus 1 according to the present embodiment includes a light source 110 that emits light having wavelengths in a visible light range, a phase contrast observation condenser 120, a slide glass 130 on which a sample is to be mounted, an objective lens unit 140, an image sensor 150, an image generating processing unit 160, and an infrared light irradiation unit 170.

With such an arrangement, the light source 110, the phase contrast observation condenser 120, the slide glass 130, the objective lens unit 140, and the image sensor 150 are arranged with their central axes aligned. This provides an overall configuration of a transmission phase contrast microscope that supports each function.

It should be noted that the phase contrast observation condenser 120 according to the present embodiment is configured as an "irradiation light optical unit" in the present invention, for example. The objective lens unit 140 and the image sensor 150 according to the present embodiment are configured as a "detection unit" in the present invention, for example. The image generating processing unit 160 and the infrared light irradiation unit 170 according to the present embodiment are respectively configured as a "generating unit" and a "stimulus input unit" in the present invention, for example.

The light source may be configured as a light-emitting diode (LED) or the like that emits light having wavelengths in a visible light range (on the order of 400 nm to 700 nm) or the like, for example. The light source 110 outputs scanning visible light to the phase contrast observation condenser 120. It should be noted that, as the light source 110, a light source that emits broadband visible light may be employed. Also, a light source configured to emit visible light having a predetermined wavelength (e.g., red or green visible light) may be employed.

The phase contrast observation condenser 120 receives the scanning visible light output from the light source 110, and outputs the irradiation light IL to the slide glass 130 on which the sample is mounted.

In particular, the phase contrast observation condenser 120 is configured including a ring aperture 121 having a ring-shaped slit 121A mounted on a front focal plane of a condenser lens 122, and the condenser lens 122, which focuses light input via the slit 121A of the ring aperture 121 and that outputs a light flux thus focused as the irradiation light IL to the sample.

The slide glass 130 is arranged on a light path of the irradiation light IL. The slide glass 130 is configured as a member on which a sample is to be mounted. In particular, the slide glass 130 is formed of a material that allows the irradiation light IL to pass through.

The objective lens unit 140 is configured including an objective lens 141 that receives, as input light, 0th order diffracted light which is the irradiation light IL that has passed through the sample without involving modulation due to the sample, and higher-order diffracted light which is the irradiation light IL that has passed through the sample with modulation due to the sample, and a transparent substrate 142 having a ring-shaped phase film 142A configured to delay (or advance) the phase of the light by $\lambda/4$ arranged on the back focal plane of the objective lens 141.

It should be noted that the 0th order diffracted light passes through the objective lens 141 and the ring-shaped phase film 142A provided on the transparent substrate 142 arranged on the back focal plane of the objective lens 141. With this, the 0th order diffracted light reaches the image sensor 150 with a phase delayed (or advanced) by $\lambda/4$.

In contrast, almost all the higher-order diffracted light passes through a transparent region 142B of the transparent substrate 142 configured as a region on which the phase film 142A is not provided, i.e., without passing through the phase film 142A and reaches the image sensor 150 with a phase that is not delayed (or advanced).

It should be noted that, in a case in which a weak-phase object such as a living cell is employed as a sample, the higher-order diffracted light that has passed through the sample has a phase that is delayed on the order of $\lambda/4$ as compared with the 0th order diffracted light in an original state. With such an arrangement, the 0th order diffracted light passes through the phase film 142A. This changes (delays or advances, which depends on the kind of the phase film 142A) the phase of the 0th order diffracted light on the order of $\lambda/4$. In a final stage, there is a phase difference of 0 or $\lambda/2$ between the 0th order diffracted light and the higher-order diffracted light.

With such an arrangement, when the phase difference between the transmitted light and the diffracted light is zero, positive interference occurs between the transmitted light and the diffracted light. This provides a bright-contrast image in which the phase object (observation target material or the like in a sample) region is displayed with high brightness and the background region is displayed with low brightness.

In contrast, when the phase difference between the transmitted light and the diffracted light is $\lambda/2$, negative interference occurs between them. This provides a dark-contrast image in which the phase object region is displayed with low brightness and the background region is displayed with high brightness.

Furthermore, an apodization phase film may be employed as the phase film 142A so as to enhance the contrast of the interference image between the 0th order diffracted light and the higher-order diffracted light detected by the image sensor 150.

The image sensor 150 is configured as a two-dimensional detector, typical examples of which include a CCD and CMOS image sensor.

With such an arrangement, the image sensor 150 receives the interference light between the 0th order diffracted light and the higher-order diffracted light irradiated via the objective lens unit 140. The image sensor 150 generates an electric signal that corresponds to the interference light thus received, and supplies its pixel information to the image generating processing unit 160.

It should be noted that a typical image sensor is capable of detecting only the intensity (the square of the amplitude) of light. However, with the interference image formed on the image sensor 150, as described above, the phase information with respect to the sample is converted into light amplitude information. Accordingly, with the image generating apparatus 1 according to the present embodiment, this arrangement is capable of detecting a two-dimensional distribution of the phase information (i.e., refractive index integration in the thickness direction) based on the light intensity information and generating an image thereof even if the sample is colorless and transparent.

The image generating processing unit 160 generates a two-dimensional image of the sample based on the electric signal supplied from the image sensor 150.

The image generating processing unit 160 may generate a two-dimensional image of a sample with a desired image acquisition rate. With the present embodiment, the image generating processing unit 160 is capable of acquiring and generating multiple phase difference images at a frame rate on the order of 1,000 fps (frames per second) based on the reasons described later.

Also, the image generating processing unit 160 may be monolithically configured with the image generating apparatus 1. Also, the image generating processing unit 160 may support coupling to an external device such as a personal computer (PC) or the like via various kinds of input/output interfaces such as a universal serial bus (USB) or the like. Also, the image generating processing unit 160 may output a signal supplied from the image sensor 150 to such an external device via such an interface, so as to allow the external device to execute image generating processing.

In addition, the image generating processing unit 160 includes a display panel such as a liquid crystal panel, organic Electro-Luminance (organic EL) panel, or the like, so as to support a function of displaying the two-dimensional image thus generated in a state that allows a user to view the image.

It should be noted that the image generating apparatus 1 may be provided with an image generating processing calculation mechanism such as a Central Processing Unit (CPU), Graphical Processing Unit (GPU), or the like, and a High-Definition Multimedia Interface (HDMI) terminal, etc. Also, the image generating apparatus 1 may be configured to display an image generated by the calculation mechanism on an external monitor based on a signal supplied from the image sensor 150.

The infrared light irradiation unit 170 is configured to irradiate stimulus input infrared light (which will simply be referred to as "infrared light" hereafter) IR to the sample corresponding to the infrared absorption line of the observation target material in the sample.

Specifically, the infrared light irradiation unit 170 includes (1) an infrared light source 171 that outputs the infrared light IR, (2) a light chopper 172, and (3) an on/off control unit 173 that controls the light chopper 172 so as to control the on/off of infrared light irradiation to the sample.

It should be noted that the infrared light irradiation unit 170 according to the present embodiment is configured as a "stimulus input unit" according to the present invention, for example. The light chopper 172 and the on/off control unit 173 operate in cooperation so as to provide a "control unit" according to the present invention.

The configuration of the infrared light source 171 is not restricted in particular so long as it is capable of emitting the infrared light IR that corresponds to the infrared absorption line of the observation target material.

It should be noted that the infrared absorption spectrum is known for each material based on FTIR or the like. Accordingly, as a basic procedure, such an arrangement may preferably be configured to allow the user to set the wavelength that corresponds to the infrared absorption line of a material to be observed from among known wavelengths. Also, the infrared light source 171 may preferably be configured to output the infrared light IR having a wavelength thus set.

Also, the wavelength of the infrared light IR to be emitted from the infrared light source 171 may be fixed to a single wavelength set by the user. Also, the wavelength of the infrared light IR to be emitted from the infrared light source 171 may be scanned by means of an appropriate mechanism.

The light chopper 172 includes an unshown shutter or light chopper wheel provided on a light path from the infrared light source 171 up to the sample and an unshown motor (not shown) that drives the shutter or light chopper wheel.

With such an arrangement, the light chopper 172 rotates the light chopper or opens/closes the shutter based on a control signal supplied from the on/off control unit 173, so as to switch on and off the infrared light irradiation state in which the infrared light IR emitted from the infrared light source 171 is irradiated to the sample.

[1.2] Operating Principle

Next, description will be made regarding the operating principle of the image generating apparatus 1 according to the present embodiment.

With the image generating apparatus 1 according to the present embodiment, in the driving operation as a transmission phase contrast microscope by means of the light source 110, the phase contrast observation condenser 120, the slide glass 130, the objective lens unit 140, and the image sensor 150, the irradiation of the infrared light IR to the sample and the blocking of the irradiation (i.e., irradiation on and irradiation off) are repeatedly switched. With this, an image (i.e., on image) acquired when the infrared light IR is irradiated to the sample (in the on state) and an image (i.e., off image) acquired when the irradiation of the infrared light IR to the sample is blocked (in the off state) are generated and displayed (output).

In particular, with the image generating apparatus 1, when the infrared light IR irradiated from the infrared light source 171 is not blocked by the light chopper 172, the infrared light IR is irradiated to the sample. In this state, the infrared light IR is irradiated to the sample (i.e. the on state) during irradiation of the irradiation light IL that is visible light.

With such an arrangement, in the on state, this maintains a state in which physical properties such as the refractive index, etc. of the observation target material included in the sample change without changing the physical properties of other materials.

As a result, in the on state, the phase of the irradiation light IL that interacts with the observation target material changes from that in the off state. In contrast, in the on state, the phase of the irradiation light IL that interacts with a material that differs from the observation target material does not change from that in the off state.

With such an arrangement, upon detecting by means of the image sensor 150 an interference image between the 0th order diffracted light IL and the higher-order diffracted light IL that pass through the sample, the image generating processing unit 160 generates a two-dimensional on image that represents the phase difference distribution of the sample in the on state.

On the other hand, when the infrared light IR irradicated from the infrared light source 171 is blocked by the light chopper 172, the infrared light IR is not irradiated to the sample. In this state (i.e., the off state), only the visible irradiation light IL is irradiated to the sample.

With this, upon detecting by means of the image sensor 150 an interference image between the 0th order diffracted light IL and the higher-order diffracted light IL that have passed through the sample, the image generating processing unit 160 generates a two-dimensional off image that represents the phase difference distribution of the sample in the off state.

On the other hand, after the image generating processing unit 160 generates the on image and the off image, the image generating processing unit 160 calculates the difference between the on image and the off image for each pixel, so as to generate a two-dimensional image that represents the change in the phase difference of the sample (which will be referred to as an "on-off difference image" hereafter).

It should be noted that the on image also includes pixel value components that correspond to materials that differ from the observation target material included in the sample. In this case, it is conceivable that it is difficult to distinguish the observation target material from the other materials.

However, by subtracting the pixel value of the off image from the pixel value of the on image for each pixel so as to generate a two-dimensional on-off difference image, such an arrangement is capable of removing the pixel value components included in the on image due to materials that differ from the observation target material.

Accordingly, with the image generating apparatus 1 according to the present embodiment, this arrangement is capable of generating a two-dimensional phase difference image including at least one from among the position, size, and shape of the observation target material, thereby allowing the observation target material to be visualized.

It should be noted that, in a case in which the infrared light irradiation unit 170 irradiates the infrared light IR that corresponds to the infrared absorption line of the observation target material, and in a case in which the slide glass 130 to be used is formed of a material having an infrared absorption spectrum band at least a part of which overlaps with the infrared absorption line described above, the slide glass 130 absorbs the infrared light IR. This leads to the occurrence of background noise due to the absorption of the infrared light IR. Accordingly, such an arrangement has the potential to have a problem in that an image of the observation target material cannot be generated with high precision.

In order to solve such a problem, in the image generating apparatus 1 according to the present embodiment, the slide glass 130 is formed of glass coated with a material such as a dielectric material or the like that does not absorb the infrared light IR and that reflects the infrared light IR, for example.

With this arrangement, the image generating apparatus 1 according to the present embodiment is configured to be capable of reducing the background noise that occurs due to the slide glass 130, thereby allowing a clear image to be generated with respect to the observation target material.

It should be noted that the slide glass 130 to be employed may be formed of a material such as calcium fluoride or the like that allows infrared light to pass through without absorption. Such an arrangement is also capable of reducing the background noise that occurs due to the occurrence of absorption of infrared light in the slide glass 130, thereby allowing a clear image to be generated.

In this case, the objective lens 141 may preferably be formed of glass coated with such a dielectric material or may preferably be configured as a lens formed of a material such as calcium fluoride or the like, in order to reduce the background noise that occurs due to the absorption of the infrared light IR in the objective lens 141. It should be noted that, in a case in which the slide glass 130 to be employed is configured to reflect the infrared light IR, the infrared light IR is reflected by the slide glass 130, and accordingly, the infrared light IR does not reach the objective lens 141. Accordingly, there is no need to design the objective lens 141 while giving consideration to the absorption of the infrared light IR. Even in a case in which the objective lens 141 is formed of typical glass, such an arrangement is capable of reducing noise that occurs in a sample image generated by the image generating apparatus 1 due to the occurrence of absorption of the infrared light IR on the optical path from the sample up to the image sensor 150, thereby allowing a clear image to be acquired.

Also, the infrared region includes an absorption line of water in the air. Accordingly, in order to reduce the effects of the infrared light absorption due to water in the air on the generated image, the optical path from the sample up to the image sensor 150 is preferably purged with an appropriate material such as nitrogen gas or the like so as to provide a state in which there are no water molecules in the atmosphere of the light path.

It should be noted that a specific method for purging the light path atmosphere with nitrogen gas or the like may be designed as desired. For example, after the light path space is set to an airtight state, nitrogen gas may be injected while exhausting air from the airtight space, so as to remove water molecules in the light path atmosphere.

The image generating apparatus 1 according to the present embodiment is configured to irradiate the infrared light IR that corresponds to the infrared absorption line of the observation target material by means of the infrared light irradiation unit 170 so as to cause the occurrence of molecular vibration absorption in only the observation target material. This changes only the refractive index in the vicinity of the observation target material. In this state, the image generating apparatus 1 is configured to generate a two-dimensional image of the observation target material included in the sample using the visible irradiation light IL. This arrangement supports a spatial resolution on the order of several hundred nm. It should be noted that, by configuring the image generating apparatus 1 as a super-resolution microscope, this arrangement is also capable of supporting a spatial resolution of several nm to several dozen nm.

Furthermore, the image generating apparatus 1 according to the present embodiment is configured to detect an observation image provided by the phase contrast microscope at a frame rate on the order of 1,000 fps by means of the two-dimensional image sensor 150. This provides high-speed image generating processing for acquiring the on image and the off image of the sample and for generating the on-off difference image.

[1.3] Results of Sample Observation by Means of Image Generating Apparatus

[1.3.1.] Observation Result 1 in a Case in which there are Silica Beads and Materials that Differ from the Silica Beads Next, description will be made with reference to FIGS. 2 through 4 regarding observation results in a case of employing a mixture of colorless and transparent silica ($SiO_2$) beads and polystyrene beads as a sample.

Figure 2:
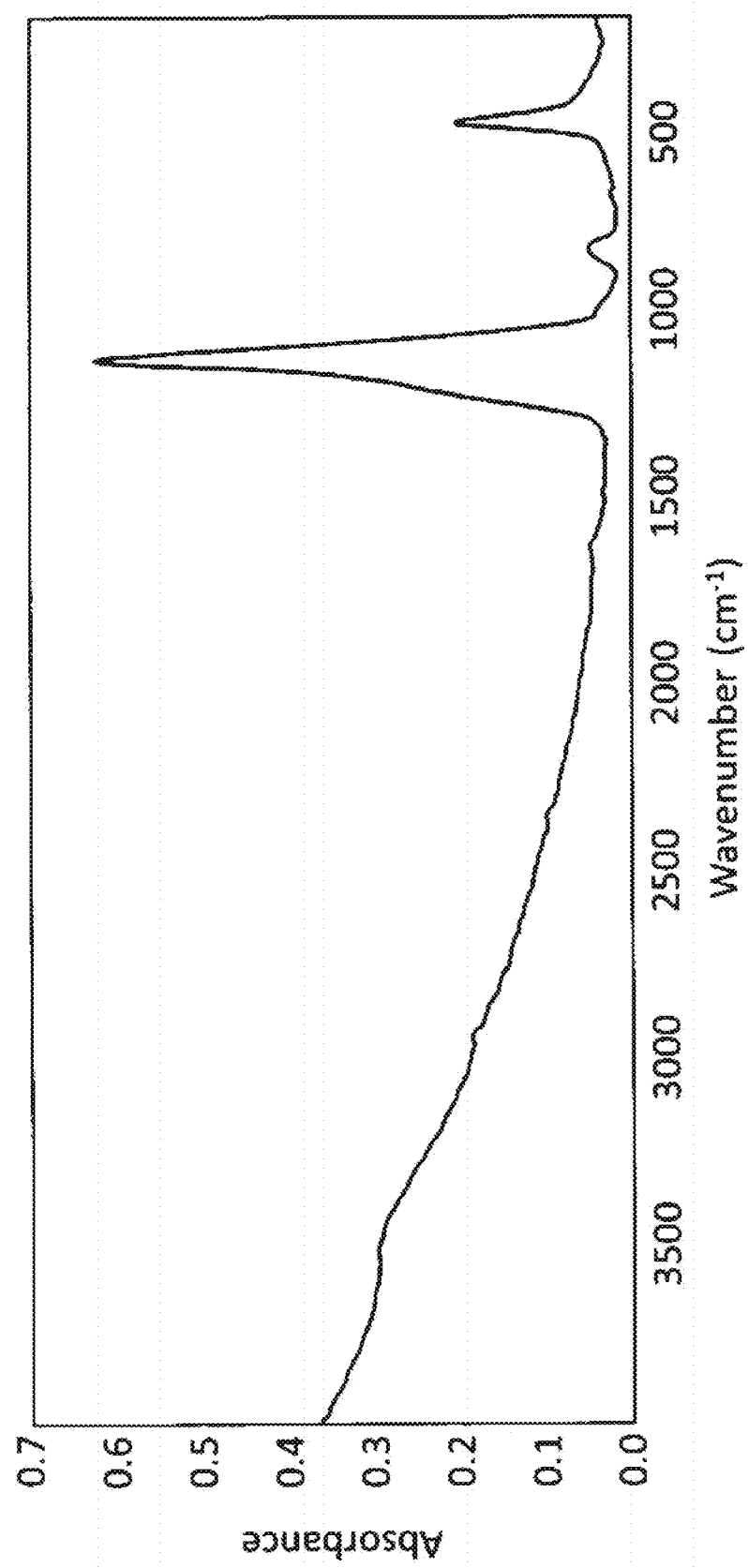
FIG. 2 is a diagram showing an example of the infrared absorption spectrum of silica beads.

It should be noted that FIG. 2 is a diagram showing an infrared absorption spectrum of silica ($SiO_2$) employed as the observation target. FIG. 3 shows diagrams each showing an example of an image of the mixture sample of the silica beads and polystyrene beads acquired and processed by the image generating apparatus 1 according to the present embodiment. Specifically, FIG. 3 shows an off image and an image that represents the difference in the pixel value for each pixel between an off image and another off image (which will be referred to as an "off-off difference image" hereafter).

FIG. 4 shows an example of an on-off difference image generated by the image generating apparatus 1 according to the present embodiment and an enlarged image thereof.

In FIGS. 3 and 4, the pixel coordinate position defined by the image sensor 150 is represented by the vertical axis and the horizontal axis (with the upper-left corner as viewed facing the drawing as (0,0)).

Figure 3A:
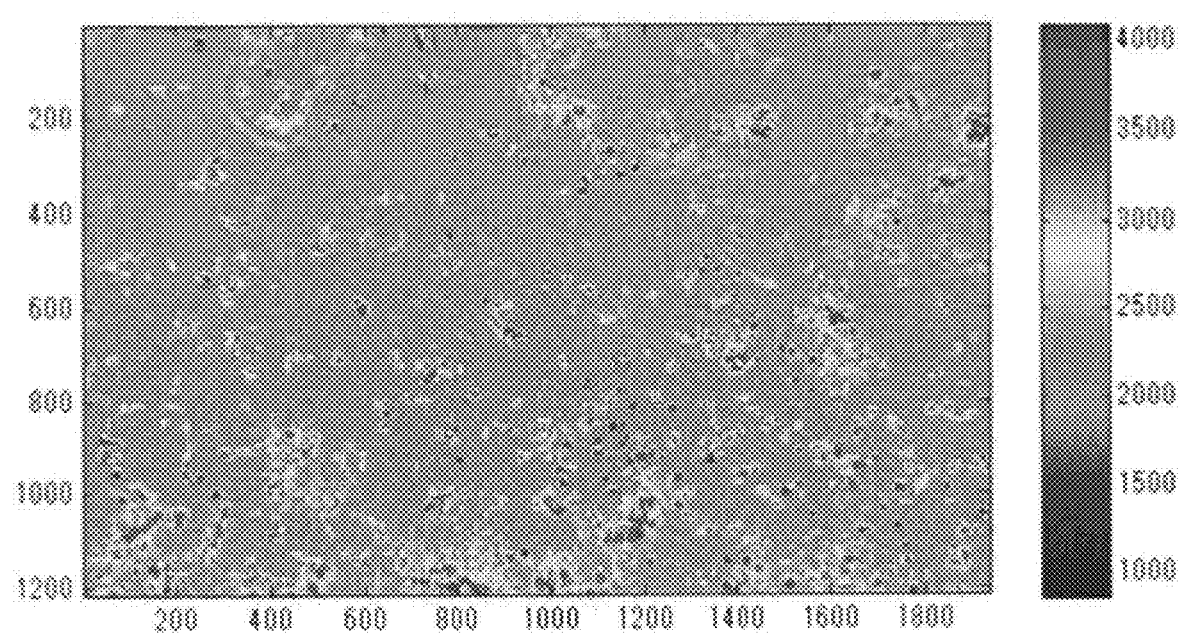
FIG. 3 is a diagram showing an image of a sample including silica beads and polystyrene beads acquired by means of the image generating apparatus shown in FIG. 1, and specifically, showing an off image and an off-off difference image thereof.

In FIG. 3A, the light intensity detected for each pixel region of the image sensor 150 is represented by a 12-bit gradation (i.e., $2^{12}$=4096 gradations). The scale of the gradation value is represented by a color bar. In contrast, in the difference images shown in FIGS. 3B and 4, the difference in the gradation value is simply shown as a visual scale in the form of a color bar.

In the on-off difference image shown in FIG. 4, the infrared light IR irradiation area is indicated by the broken line.

In the present observation, the silica beads were observed under the following conditions.

<Condition 1>

Colorless and transparent silica beads (refractive index of 1.46) having a diameter of approximately 5 μm to be observed and colorless and transparent polystyrene beads (refractive index of 1.59) having a diameter of approximately 1 μm were mounted on the slide glass 130 together with matching oil having a refractive index of 1.50, and aligned with the central axes of the phase contrast observation condenser 120, the objective lens unit 140, and the image sensor 150.

<Condition 2>

As shown in FIG. 2, the infrared absorption spectrum of silica has a peak at 1087.6 $cm^{-1}$ due to the Si—O vibration mode. Accordingly, in order to provide infrared light matching the infrared absorption line of silica, the infrared light source 171 was set so as to irradiate the infrared light IR with a wavelength of 9.56 μm, i.e., with a wavenumber of 1045 $cm^{-1}$, and to irradiate the infrared light IR to the sample.

<Condition 3>

As the light source 110, an LED configured to emit light having a wavelength of 628 nm (red visible light) was employed.

<Condition 4>

The output of the infrared light source 171 was set to 14 mW. An elliptical region having a size of 540×300 μm defined around the central axis on the slide glass 130 was set as an infrared light irradiation area.

<Condition 5>

The exposure time in image acquisition was set to 9 ms.

With this, images of the sample (silica beads in the matching oil) were acquired at a frame rate of 2.5 fps by the image sensor 150 and the image generating processing unit 160. As a result, in the off state, a phase difference image (i.e., off image) as shown in FIG. 3A was acquired.

In the present observation, the mixture sample of silica beads and polystyrene beads having different sizes was intendedly used for verification of the principle. As shown in FIG. 3A, this allowed the silica beads and the polystyrene beads to be distinguished based on the size or the pixel value (i.e., phase information) using only an off image. However, with a realistic sample, in some cases, different materials included in such a sample have similar sizes or involve similar phase information. Accordingly, in some cases, it is difficult to distinguish such different materials using only an off image. In such a case, which will be described below, by generating a difference image (on-off difference image) between an on image and an off image, this arrangement is capable of extracting a particular material in the form of an image, thereby allowing such different materials to be distinguished.

Figure 3B:
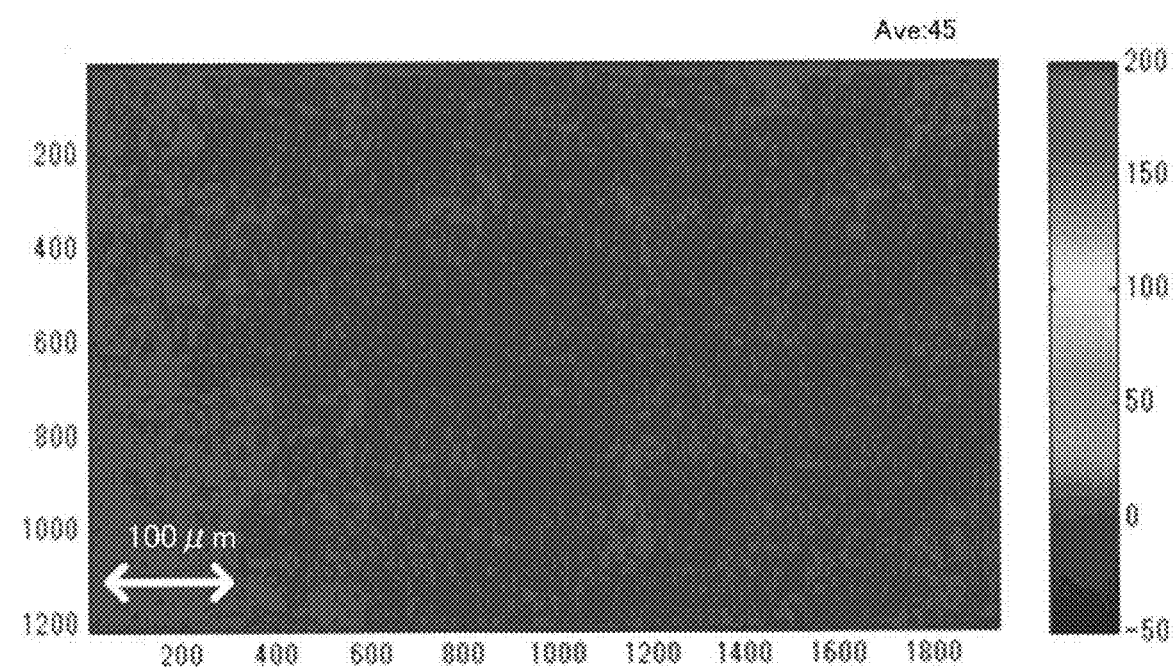

A pixel value average was calculated for each pixel of the off-off difference images over 45 frames while generating the off-off difference images by calculating the pixel value difference for each pixel between off images. As a result, as shown in FIG. 3B, a difference value of zero was obtained for almost all the pixels. That is to say, the silica beads cannot be visualized.

In contrast, in a case in which an on image and an off image are acquired to generate an on-off difference image, and a pixel value average is calculated for each pixel over 90 frames of the on-off difference images, an image as shown in FIG. 4 is obtained. That is to say, it can be understood that this allows only the silica beads to be selectively visualized.

Figure 4A:
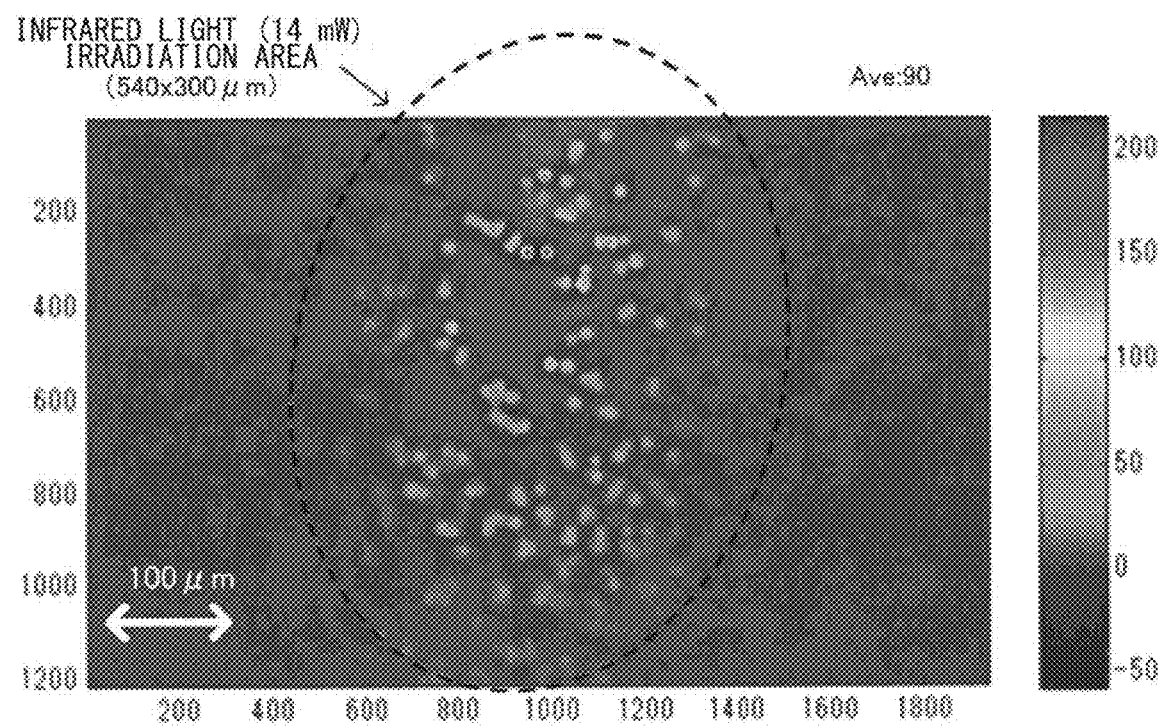
FIG. 4 is a diagram showing an image of a sample including silica beads and polystyrene beads acquired by means of the image generating apparatus shown in FIG. 1, and specifically, showing an on-off difference image and an enlarged image thereof.

It should be noted that, in FIGS. 3B and 4A, a scale bar of 100 μm is shown as a reference in the form of a white line. In FIG. 4A, the infrared light irradiation area is indicated by the broken line.

Figure 4B:
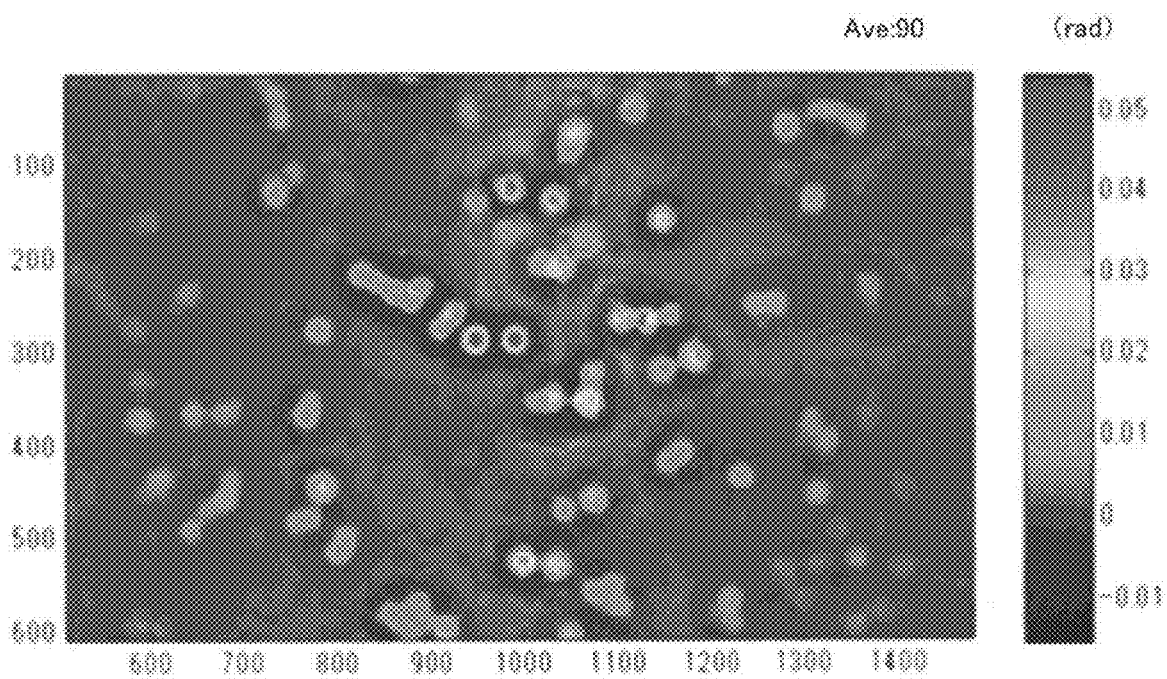

Furthermore, in order to verify the effect of the infrared light irradiation on the image (i.e., the degree of success in allowing the silica beads to be visualized), FIG. 4B shows an enlarged image of the infrared light irradiation area indicated by the broken line in FIG. 4A.

It should be noted that, in FIG. 4B, assuming that each silica bead is a weak-phase object, the change in phase (radian) is estimated based on the change in pixel value of the phase difference image of the sample between the on state and the off state, and is shown using a color bar.

As shown in FIG. 4B, with respect to a region (pixels) in which the silica beads having a diameter of 5 μm are displayed, the pixel value difference represented by the on-off difference image (average over 90 frames) is 0.03 to 0.05 radians. In contrast, with respect to the other regions (i.e., a region in which the matching oil or the polystyrene beads are displayed and a region in which only the slide glass 130 is displayed), the pixel value difference is approximately 0 radians. That is to say, it has been confirmed that such an arrangement is capable of canceling out the pixel value components except for those due to the silica beads to be observed, thereby allowing the silica beads to be selectively visualized. Furthermore, it can be understood that the region in which contrast occurred in the on-off difference image corresponds to the region including the silica beads (i.e., circular images having a relatively large size) shown in FIG. 3A.

[1.3.2] Observation Results 2 in a Case in which there are Silica Beads and Materials that Differ from the Silica Beads Next, description will be made with reference to FIGS. 5 and 6 regarding observation results with the image generating apparatus 1 according to the present embodiment in a case of employing a sample including silica beads and materials that differ from the silica beads.

It should be noted that FIG. 5 is a diagram showing an image of a sample including silica beads and polystyrene beads acquired by the image generating apparatus 1 according to the present embodiment. Specifically, FIG. 5 is a diagram showing an off image and an off-off difference image thereof. FIG. 6 is a diagram showing an on-off difference image thereof.

Specifically, silica beads (refractive index of 1.46) having a diameter of approximately 5 μm and polystyrene beads (refractive index of 1.59) having a diameter of approximately 4.5 μm were mounted on the slide glass 130 together with matching oil having a refractive index of 1.50. Furthermore, the slide glass 130 is aligned with the central axes of the phase contrast observation condenser 120, the objective lens unit 140, and the image sensor 150.

Figure 5A:
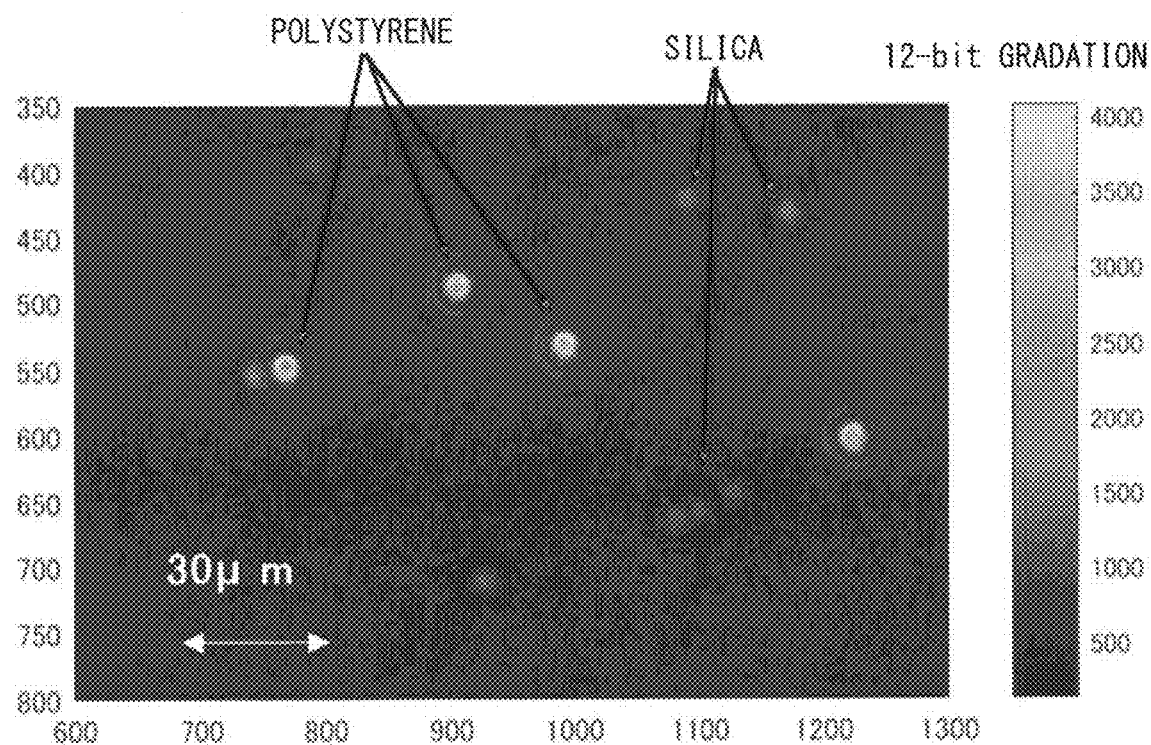
FIG. 5 is a diagram showing an image of a sample including silica beads and polystyrene beads acquired by means of the image generating apparatus shown in FIG. 1, and specifically, showing an on-off difference image thereof.
Figure 5B:
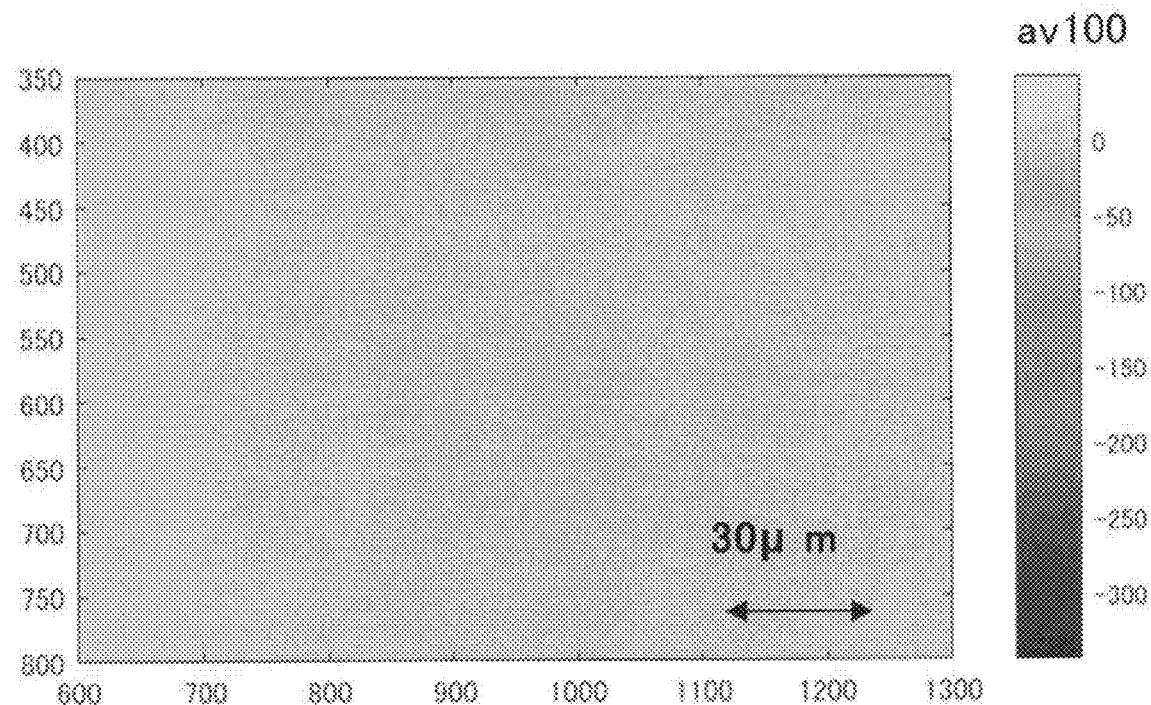
Figure 6:
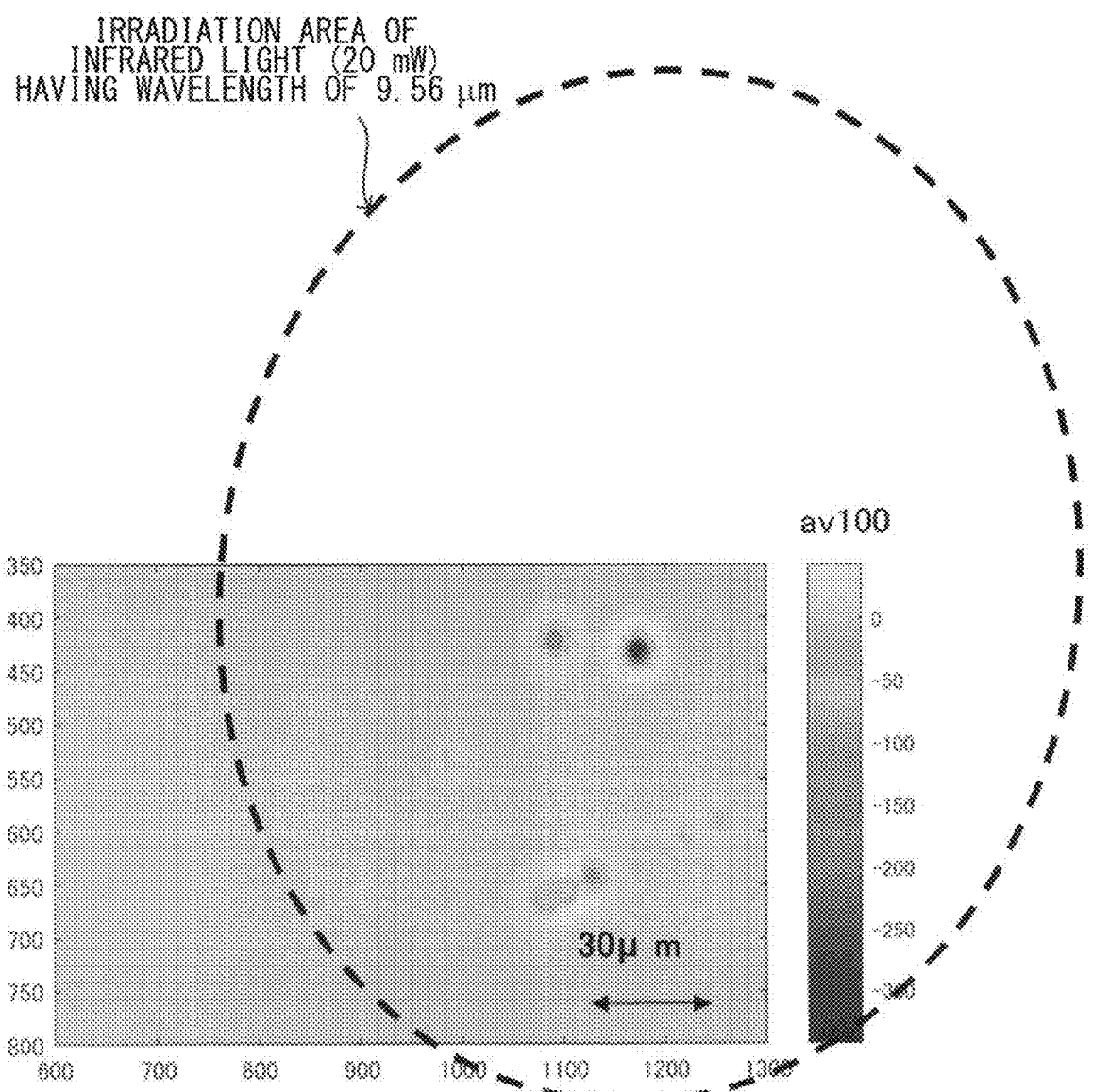
FIG. 6 is a diagram showing an image of a sample including silica beads and polystyrene beads acquired by means of the image generating apparatus shown in FIG. 1, and specifically, showing an on-off difference image thereof.

In the present observation, in order to provide infrared light matching the infrared absorption line of the silica beads, in the same manner as with the example described above, the infrared light source 171 was set so as to irradiate the infrared light IR with a wavelength of 9.56 μm, i.e., with a wavenumber of 1045 $cm^{-1}$, and to irradiate the infrared light IR with an output of 20 mW to the irradiation area indicated by the broken line shown in FIG. 6. In this state, images of the sample were acquired at a frame rate of 10 fps while switching on and off the infrared light IR at a frequency of 105 Hz, so as to generate an on image and an off image. Furthermore, an off-off difference image and an on-off difference image were generated. As a result, the observation results were obtained as shown in FIGS. 5 and 6. It should be noted that, in the present observation, the exposure time was set to 0.69 ms.

It should be noted that, in FIGS. 5 and 6, the pixel coordinate position defined by the image sensor 150 is represented by the vertical axis and the horizontal axis (with the upper-left corner as viewed facing the drawing as (0,0)) as with the examples shown in FIGS. 3 and 4.

Furthermore, in FIG. 5A, the light intensity detected for each pixel region of the image sensor 150 is represented by a 12-bit gradation as with the example shown in FIG. 3. The scale of the gradation value is indicated by a color bar. In contrast, in the difference images shown in FIGS. 5B and 6, the difference in the gradation value is simply shown as a visual scale in the form of a color bar.

In the on-off difference image shown in FIG. 6, the infrared light IR irradiation area is indicated by the broken line.

As shown in FIG. 5A, it can be understood that the silica beads and the polystyrene beads can be distinguished using only the off image. This can be considered to be due to the large difference in the refractive index between the silica beads and the polystyrene beads used for verification of the principle. However, in a case of observing an actual biological sample, it can be considered that there is a small difference in the refractive index between materials included in the sample. Accordingly, there is a high probability that it would be difficult to clearly distinguish the observation target material.

In order to solve such a problem, a pixel value average was calculated for each pixel of the on-off difference image over 100 frames, thus providing an image as shown in FIG.

6. Furthermore, a pixel value average was calculated for each pixel of the off-off difference image over 100 frames, thus providing an image as shown in FIG. 5B.

As shown in FIG. 5B, in the image obtained based on the pixel value average calculated for each pixel of the off-off image, the difference value was approximately zero for almost all the pixels. That is to say, the silica beads could not be distinguished.

In contrast, in the image obtained based on the pixel value average calculated for each pixel of the on-off image (FIG. 6), the difference value is approximately zero for a region including no silica bead image regardless of the presence or absence of a polystyrene bead image. Furthermore, such an image allows a change in refractive index to be observed for a region including a silica bead image. This provides an image in which only silica beads stand out. In contrast, no polystyrene beads were not visualized. That is to say, it can be confirmed that such an arrangement is capable of generating a two-dimensional image that allows the position, size, and shape to be identified for only the silica beads in the sample.

Figure 7A:
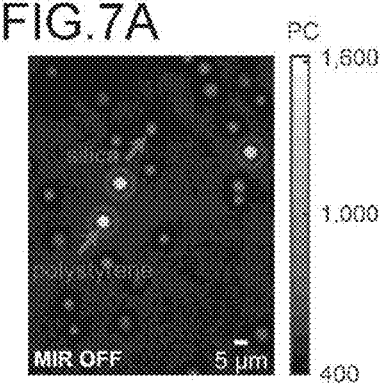
FIGS. 7A through 7D are diagrams showing image acquisition results with respect to a sample including silica beads and polystyrene beads obtained by the image generating apparatus shown in FIG. 1.
Figure 7B:
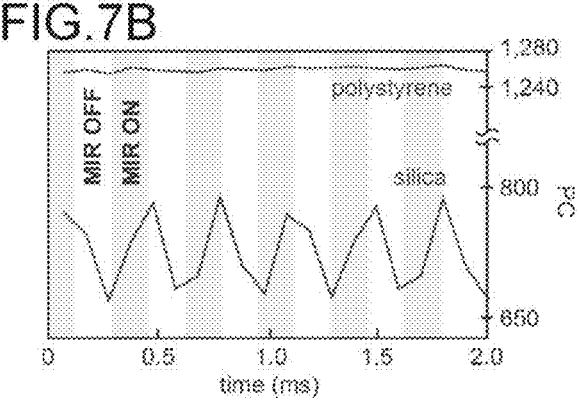

FIGS. 7A through 7D are diagrams showing image acquisition results for a sample including silica beads and polystyrene beads. FIG. 7A shows a phase contrast image (off image) when the infrared light IR is set to the off state. FIG. 7B shows a change in the pixel values with time for pixels (indicated by the arrows) at which silica beads and polystyrene beads are displayed. For the silica beads, which have a resonance spectrum with respect to the infrared light IR, the pixel values change according to the on/off state of the infrared light IR. In contrast, for the polystyrene beads, which do not have resonance with respect to the infrared light IR, the pixel values remain at a constant value regardless of whether the infrared light IR is set to the on state or the off state. It should be noted that the infrared light IR is turned on and off at 3,000 Hz.

Figure 7C:
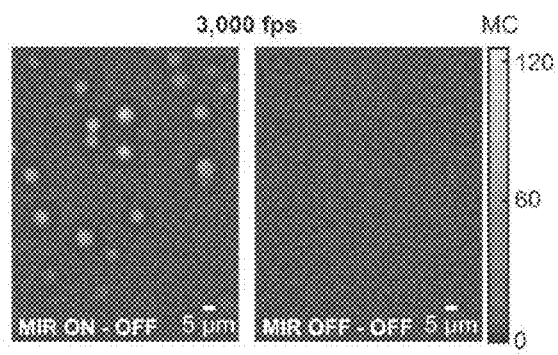
Figure 7D:
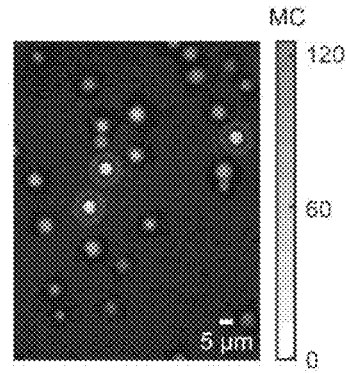

FIG. 7C shows, in the image on the right side, an off-off difference image obtained by calculating the difference in the luminance values of the phase contrast (PC) image between the off states of the infrared light IR. In this image, no material can be visualized. FIG. 7C also shows, in the image on the left side, a molecular contrast (MC) image, i.e., an on-off difference image obtained by calculating the difference in the luminance values of the phase contrast image between the off state of the infrared light IR and the on state of the infrared light IR. It can be understood that only the silica beads, which resonate with the incident infrared light IR, can be visualized. Here, the image acquisition rate is 3,000 frames per second. FIG. 7D shows an image obtained by superimposing the on-off difference image shown on the left side in FIG. 7C on the off image shown in FIG. 7A.

Here, the dynamic range, which is a camera function provided by the image sensor 150 and the image generating processing unit 160, is limited by the maximum difference in the refractive index in the sample. By setting the detection maximum value of the camera to a phase difference signal that corresponds to the maximum refractive index difference of the sample, this determines the minimum phase difference that can be detected by the camera.

Accordingly, with the image generating apparatus 1 according to the present embodiment, the phase detection sensitivity is inversely proportional to the distribution width of the refractive index of the sample. In a case in which the maximum refractive index difference is 0.04 (i.e., 1.5-1.46) as in the example of a combination of silica beads and matching oil described above, this provides a phase detection sensitivity of 0.01 radians for each frame of the on-off difference image. It should be noted that the phase detection sensitivity represents a value limited by shot noise in a case of employing an image acquisition element having a saturation charge capacity of approximately 30,000 e– for each pixel.

On the other hand, in a case in which an actual biological sample is observed, bioactive molecules such as proteins or the like can be preferably observed for a sample having a thickness on the order of 5 μm with a concentration on the order of 1 mM (millimolar).

In particular, in infrared light irradiation that corresponds to the condition employed in the present experiment, it is estimated that the change in phase that occurs due to proteins included in a sample having a thickness on the order of 5 μm with a concentration on the order of 1 mM is on the order of 0.005 radians. Accordingly, in order to allow the image generating apparatus 1 according to the present embodiment to be applied to actual biological sample observation, such an arrangement requires a sensitivity on the order of 50. However, the sensitivity of the detection system is limited by shot noise. Accordingly, an on-off difference image is generated to be on the order of 2,500 frames. Specifically, such an arrangement requires the signal-to-noise ratio (SNR) to be raised to that of 50 times (i.e., requires $50^2$=2,500 frames) the original value by calculating a pixel value average for each pixel of the on-off difference image while generating the on-off difference image.

Furthermore, in the biological sample observation described above, 2,500 frames of the on-off difference image are preferably generated in a period of time on the order of 1 second.

Accordingly, in the present embodiment, an arrangement is employed configured to acquire an image of a sample at a frame rate on the order of 1,000 fps in a state in which the image sensor 150 and the image generating processing unit 160 are operated in conjunction so as to generate an on-off difference image, thereby generating a two-dimensional phase difference image of the sample. It should be noted that a high-speed camera that has been commercialized in recent years may be employed to support a frame rate of 1,000 fps.

[1.3.3] Regarding Results of Observation of Biological Sample

Next, description will be made with reference to FIGS. 8 and 9 regarding results of observation of biomolecules included in a biological sample (pig muscle cells).

It should be noted that FIG. 8 is a diagram showing an acquired image of a pig muscle cell sample (slice with a thickness of 10 μm), and specifically, FIG. 8 shows an off image and an off-off difference image thereof. FIG. 9 is a diagram showing an on-off difference image thereof.

Figure 8A:
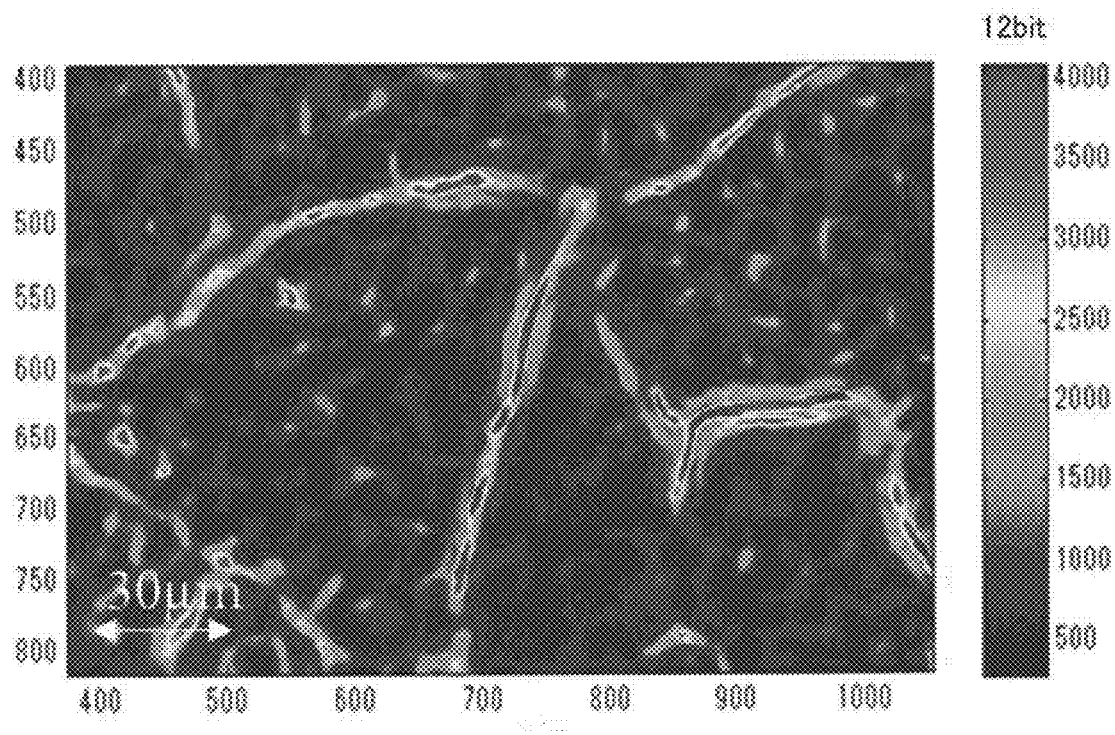
FIG. 8 is a diagram showing an image of pig muscle tissue acquired by the image generating apparatus shown in FIG. 1, and specifically, showing an off image and an off-off difference image thereof.
Figure 8B:
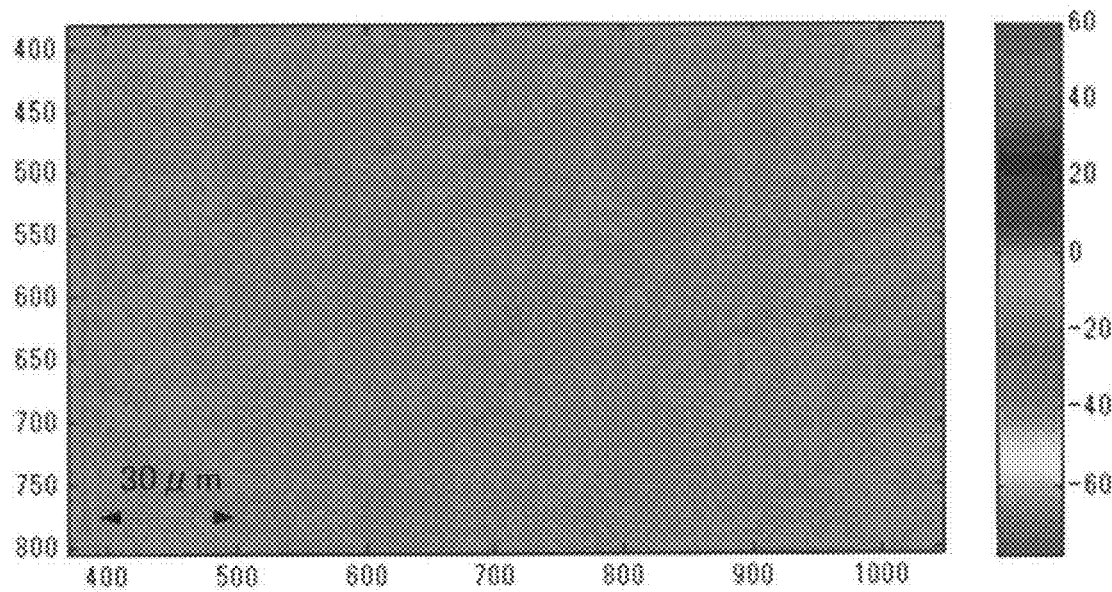
Figure 9:
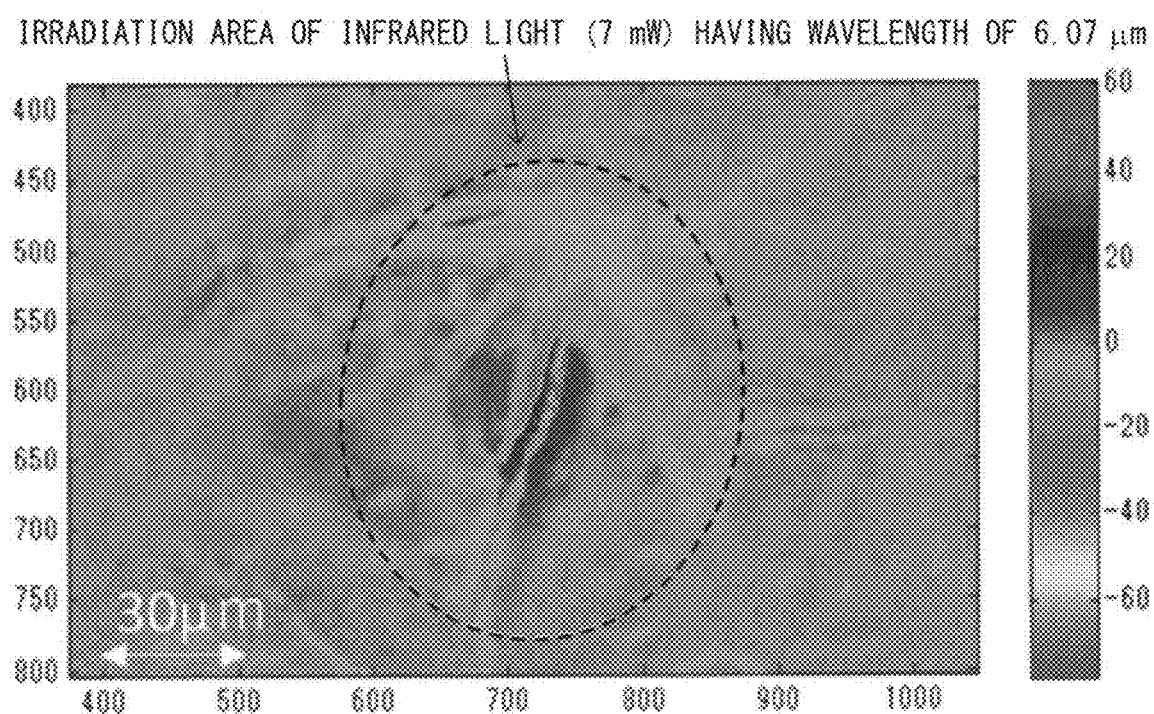
FIG. 9 is a diagram showing an image of pig muscle tissue acquired by the image generating apparatus shown in FIG. 1, and specifically, showing an on-off difference image thereof.

It should be noted that, in FIGS. 8 and 9, the pixel coordinate position defined by the image sensor 150 is represented by the vertical axis and the horizontal axis (with the upper-left corner as viewed facing the drawing as (0,0)) as with the examples shown in FIGS. 3 and 4.

Furthermore, in FIG. 8A, the light intensity detected for each pixel region of the image sensor 150 is represented by a 12-bit gradation as with the example shown in FIG. 3. The scale of the gradation value is indicated by a color bar. In contrast, in the difference images shown in FIGS. 8B and 9, the difference in the gradation value is simply shown as a visual scale in the form of a color bar.

In the on-off difference image shown in FIG. 9, the infrared light IR irradiation area is indicated by the broken line.

In this observation, the muscle cells were observed under the following conditions.

<Condition 1>

A slice of pig muscle tissue having a thickness of 10 μm was mounted on the slide glass 130 such that it was aligned with the central axes of the phase contrast observation condenser 120, the objective lens unit 140, and the image sensor 150.

<Condition 2>

In order to visualize the observation target proteins included in the sample, the infrared light IR to be irradiated from the infrared light source 171 was set having a wavelength of 6.07 μm, so as to cause molecular vibration absorption in the sample due to the amide I band which corresponds to C=O stretching vibration that occurs in peptide bonds in proteins.

<Condition 3>

As the light source 110, an LED configured to emit light having a wavelength of 628 nm (red visible light) was employed.

<Condition 4>

The output of the infrared light source 171 was set to 7 mW. An elliptical region indicated by the broken line in FIG. 9 defined around the central axis on the slide glass 130 was set as an infrared light irradiation area.

<Condition 5>

The exposure time in image acquisition was set to 2.5 ms.

With such an arrangement, an image of the sample (i.e., pig muscle tissue) was acquired at a frame rate of 8 fps by means of the image sensor 150 and the image generating processing unit 160 while switching the infrared light IR on and off at a frequency of 4 Hz. As a result, in the off state, a phase difference image (i.e., off image) was acquired as shown in FIG. 8A.

Furthermore, the pixel value average was calculated for each pixel of the off-off difference image over 100 frames, thus providing an image as shown in FIG. 8B. A difference value of zero was obtained for almost all the pixels.

In contrast, as a result of averaging the on-off difference image over 100 frames, as shown in FIG. 9, an image was generated that allows proteins employed as the observation target materials to be observed such that they stand out. It has been verified that such an arrangement is capable of generating an on-off difference image that allows the position, size, and shape to be identified for the observation target proteins included in the biological sample.

Figure 10A:
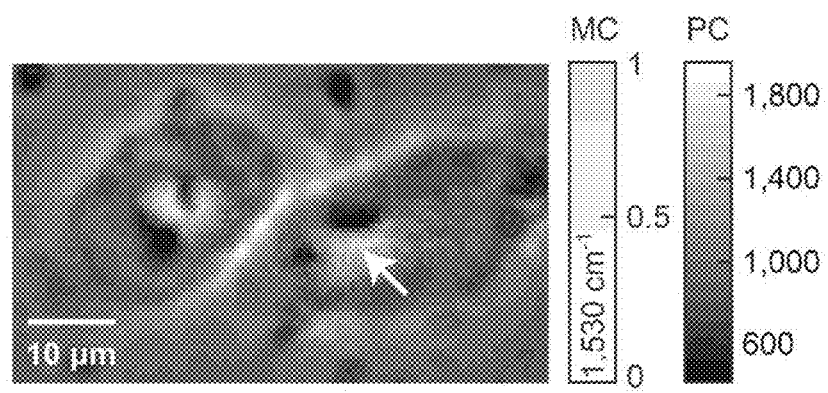
FIGS. 10A and 10B are diagrams showing results obtained by observing HeLa cells by means of the image generating apparatus shown in FIG. 1.
Figure 10B:
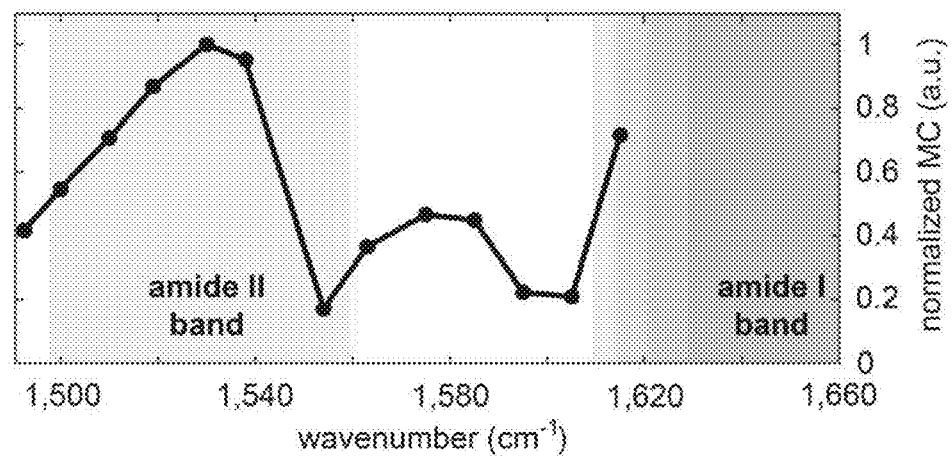

FIGS. 10A and 10B are diagrams showing the observation results in a case in which HeLa cells were observed by means of the image generating apparatus 1 shown in FIG. 1. In this observation, in the on state of the infrared light IR, the wavenumber thereof is swept. It should be noted that the infrared light IR is output with a modulation frequency of 250 Hz and with an infrared power of 16 to 40 mW (on an irradiation spot of approximately 100×100 m²). The camera was operated at a frame rate of 10,000 fps.

FIG. 10A is an image obtained by superimposing an on-off difference image of the HeLa cells sample acquired with infrared light having a wavenumber of 1530 cm$^{-1}$ on a phase difference image thereof with the infrared light IR in the off state. FIG. 10B is a diagram showing an on-off difference image with respect to a pixel indicated by the arrow in FIG. 10A in a case in which the wavenumber of the infrared light IR is changed from 1492.5 to 1615 cm$^{-1}$, i.e., showing the change in molecular contrast (MC). It can be understood that the amide II bond peak (in the vicinity of 1530 cm$^{-1}$), which is commonly observed in the infrared spectrum of proteins, is visualized. The intensity of the infrared light changes depending on the change in the wavenumber. Accordingly, MC is normalized by the power of the infrared light.

[2] Second Embodiment

[2.1] Configuration

Figure 11:
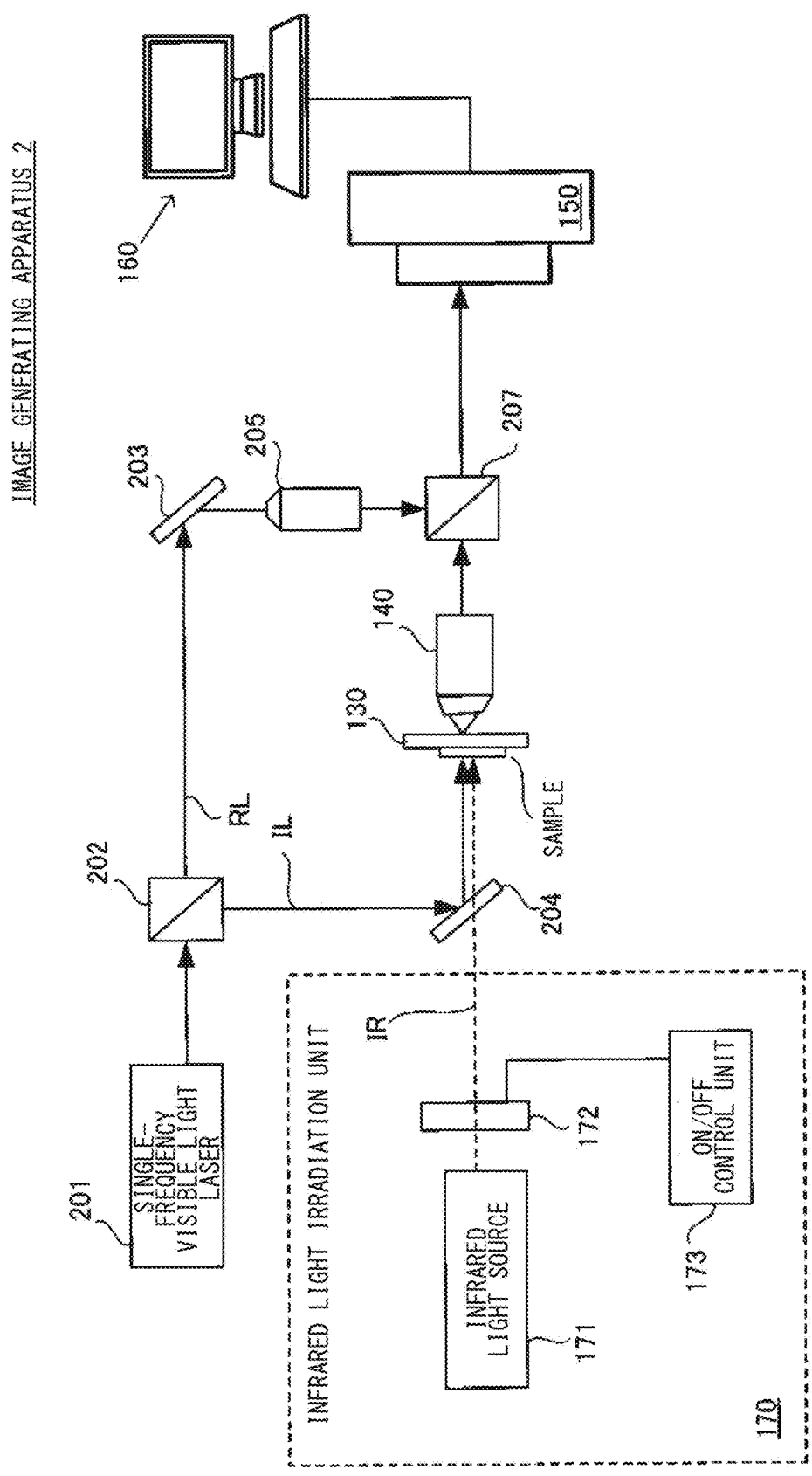
FIG. 11 is a block diagram showing a configuration of an image generating apparatus according to a second embodiment.

Next, description will be made with reference to FIG. 11 regarding a second embodiment of the present invention. It should be noted that FIG. 11 is a block diagram showing a configuration of an image generating apparatus 2 according to the present embodiment.

In the present embodiment, the image generating apparatus is employed as an off-axis digital holographic microscope, unlike the image generating apparatus according to the first embodiment employed as a phase contrast microscope, which is a feature of the present embodiment.

That is to say, in the present embodiment, the phase information with respect to a colorless and transparent sample is detected in a quantitative manner using an off-axis digital holographic microscope, in order to visualize an observation target material included in a sample.

In a digital holographic microscope, an interference image between the irradiation light IL modulated due to the sample and reference light RL that has not been subjected to modulation due to the sample can be detected as a digital image. Furthermore, by applying appropriate image processing to the interference image, the digital holographic microscope is capable of generating a two-dimensional image that represents a phase distribution of the sample in a quantitative manner.

Accordingly, by generating a quantitative phase image for each of the on state and the off state of the infrared light IR, and by generating a difference image between them, this arrangement visualizes the change in refractive index that occurs due to the infrared light IR at a position in the vicinity of an observation target material in a colorless and transparent sample.

In the present embodiment, as the phase information with respect to the sample, a quantitative phase image detected by a digital holographic microscope is employed instated of employing a phase difference image detected by means of a phase contrast microscope according to the first embodiment, which is a feature of the present embodiment.

It should be noted that, in the present embodiment, the same members as those in the first embodiment are denoted by the same reference numerals, and description thereof will be omitted.

As shown in FIG. 11, an image generating apparatus 2 according to the present embodiment includes a laser 201 that outputs visible-range light having a single frequency, a beam splitter 202, a mirror 203, a wavelength-selective transmission film 204, a beam expander 205, a slide glass 130, an objective lens 141, a beam splitter 207, an image sensor 150, and an image generating processing unit 160.

Furthermore, the image generating apparatus 2 includes an infrared light irradiation unit 170 including an infrared light source 171 that emits infrared light IR, a light chopper 172, and an on/off control unit 173, as with the image generating apparatus 1 according to the first embodiment.

It should be noted that the beam splitter 202 and the wavelength-selective transmission film 204 according to the present embodiment are configured as an "irradiation optical unit" according to the present invention, for example. The objective lens 141 and the image sensor 150 operate in conjunction so as to provide a "detection unit" according to the present invention. Also, for example, the image generating processing unit 160 and the infrared light irradiation unit 170 according to the present embodiment are respectively configured as a "generating unit" and a "stimulus input unit" according to the present invention.

The single-frequency visible light laser 201 irradiates light at a predetermined frequency in a visible range (i.e., visible light) to the beam splitter 202.

The beam splitter 202 splits the incident visible light into the reference light RL and the irradiation light IL. The reference light RL is output toward the mirror 203. The irradiation light IL is output toward the wavelength-selective transmission film 204.

The reference light RL output to the mirror 203 via the beam splitter 202 is expanded by the beam expander 205, which is formed of the same kinds of lenses as those of the objective lens unit 141. The reference light RL thus expanded is output to the beam splitter 207.

The wavelength-selective transmission film 204 functions as an optical filter having a function of allowing infrared-region light to pass through and a function of reflecting visible-region light. Accordingly, the wavelength-selective transmission film 204 allows the infrared light IR irradiated from the infrared light irradiation unit 170 to pass through directly such that it is irradiated to a sample mounted on the slide glass 130.

Furthermore, the wavelength-selective transmission film 204 reflects the irradiation light IL irradiated from the beam splitter 202 such that it is irradiated to the sample mounted on the slide glass 130.

The beam splitter 207 transmits half the light that has passed through the sample via the objective lens 141, and reflects half the reference light, such that they are irradiated to the image sensor 150.

[2.2] Operating Principle

Next, description will be made regarding the operating principle of the present embodiment.

In a state in which the on/off control unit 173 sets the irradiation of infrared light to the sample to the on state, the infrared light IR passes through the wavelength-selective transmission film 204 without being blocked by the light chopper 172, and such that it is irradiated to the sample mounted on the slide glass 130.

When the infrared light IR is irradiated to the sample, molecular vibration absorption occurs due to the observation target material included in the sample. This changes the refractive index in the vicinity of the observation target material.

Accordingly, in the same manner as in the first embodiment, the image sensor 150 detects an interference image that occurs due to interference between the reference light RL reflected by the beam splitter 207 and the irradiation light IL that has passed through the sample.

Furthermore, the image generating processing unit 160 applies image processing based on the principles of digital holography to the interference image detected by the image sensor 150 as described above, so as to generate a two-dimensional quantitative phase image of the sample. Based on the two-dimensional phase image thus generated, the image generating processing unit 160 generates an on image and an off image that correspond to the state of infrared light IR irradiation to the sample. Furthermore, by calculating a pixel value difference for each pixel between the on image and the off image, the image generating processing unit 160 generates an on-off difference image of the sample.

In this stage, the image generating processing unit 160 operates in conjunction with the image sensor 150, so as to acquire and generate an image of the sample at a frame rate on the order of 1,000 fps. With this arrangement, the image generating apparatus 2 according to the present embodiment is capable of visualizing and generating an image of bioactive molecules (proteins, etc.) with a concentration on the order of 1 mM in a biological sample having a thickness on the order of 5 µm.

It should be noted that the image generating processing unit 160 may be provided within the image generating apparatus 2 in the same manner as in the first embodiment. Also, the image generating processing unit 160 may be configured as an external device such as a PC or the like coupled to the image generating apparatus 2 via an interface such as USB or the like.

With the present embodiment, in a case in which absorption of infrared light IR having a wavelength that resonates with the infrared absorption line of the observation target material occurs in the slide glass 130, there is the potential for background noise to occur in the on image and the on-off difference image generated by the image generating processing unit 160. Accordingly, the slide glass 130 to be employed is preferably formed using a material that reflects the infrared light IR without absorption thereof. It should be noted that the objective lens 141 may be configured as a glass member or the like coated with a material that does not absorb the infrared light IR, as with the slide glass 130.

It should be noted that, in a case in which the slide glass 130 to be employed is configured to reflect the infrared light IR, in order to provide sufficient performance, the objective lens 141 to be employed may be formed of a typical glass material. This is for the same reason as described in the first embodiment. Conversely, in a case in which the slide glass 130 to be employed is configured to allow the infrared light IR to pass through, the objective lens 141 is preferably configured to reflect or transmit the infrared light IR without absorption thereof.

[3] Modifications

[3.1] Modification 1

First, description will be made with reference to FIGS. 12 and 13 regarding a modification 1 configured as a modification in which the slide glass is formed of a typical glass material.

Figure 12A:
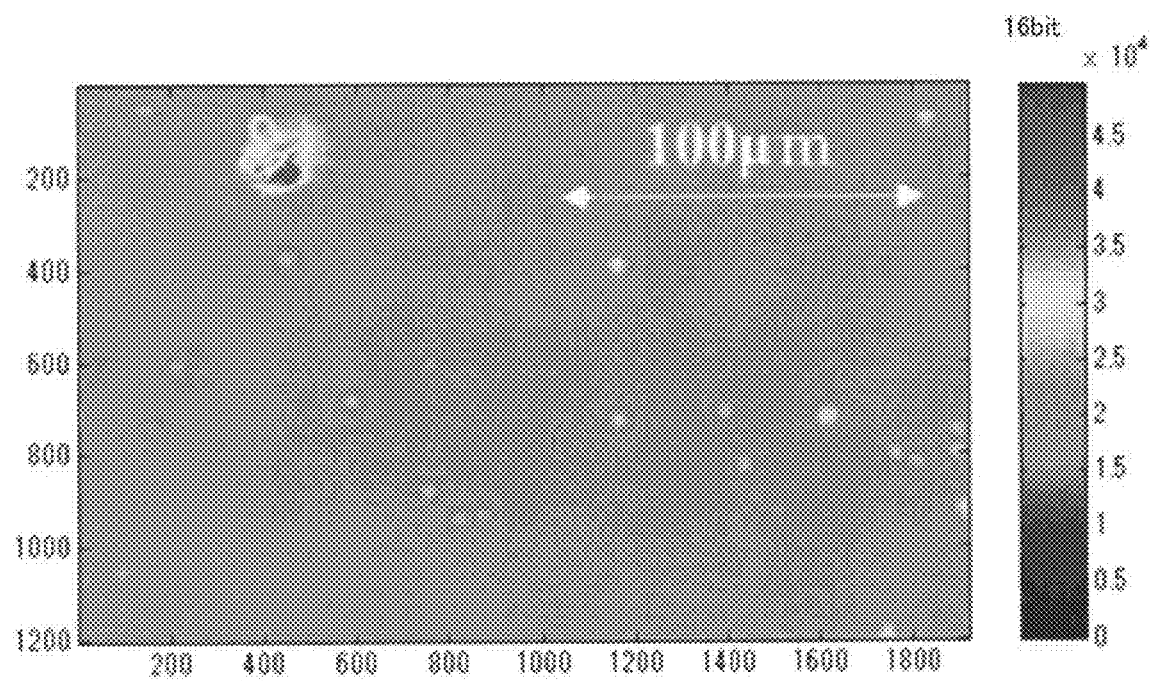
FIG. 12 is a diagram showing an image of silica beads acquired by an image generating apparatus according to a modification 1, and specifically, showing an off image and an off-off difference image thereof.
Figure 12B:
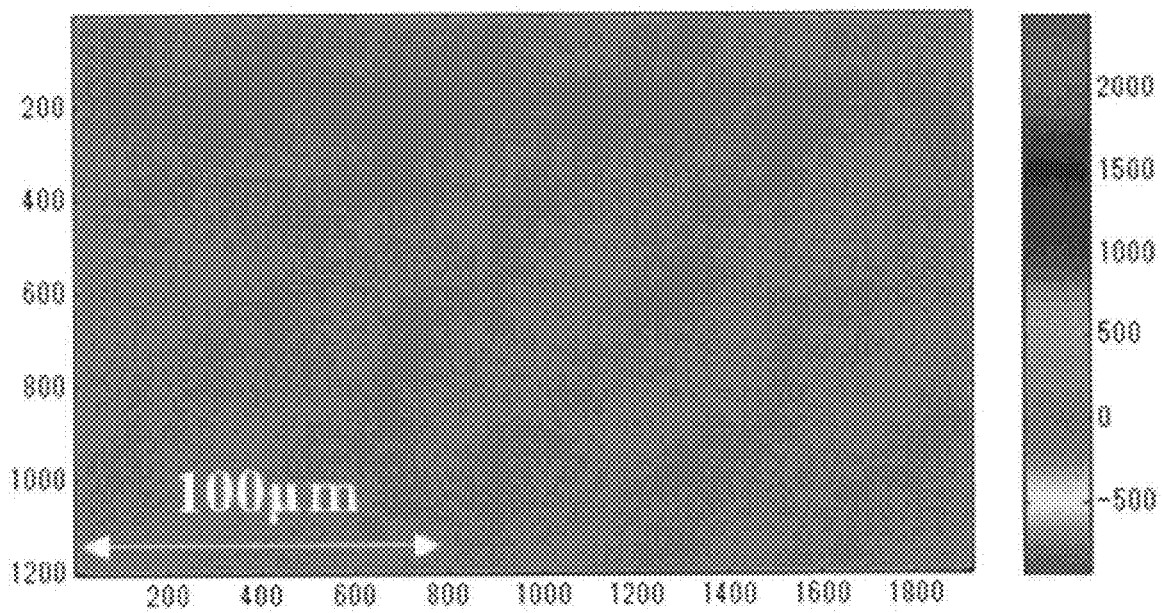

It should be noted that FIG. 12A is a diagram showing an off image acquired using the slide glass described above. FIG. 12B is a diagram showing an average over 100 frames of the off-off difference image acquired using the slide glass described above. FIG. 13 is a diagram showing an average over 100 frames of the on-off difference image.

In the present embodiment, the slide glass formed of an ordinary glass material is employed instead of employing the slide glass 130 or the like configured to reflect or transmit the infrared light IR according to the embodiments described above. This is a feature of the present modification.

Regarding the present modification, in order to investigate the effects of the kind of the glass on the observation image, silica beads were mounted on a slide glass formed of a typical glass material together with matching oil having a refractive index of 1.5. In this state, an on image, off image, and on-off difference image were generated for the silica beads by means of the image generating apparatus 1 according to the first embodiment. Observation was made based on the images thus generated.

Figure 13:
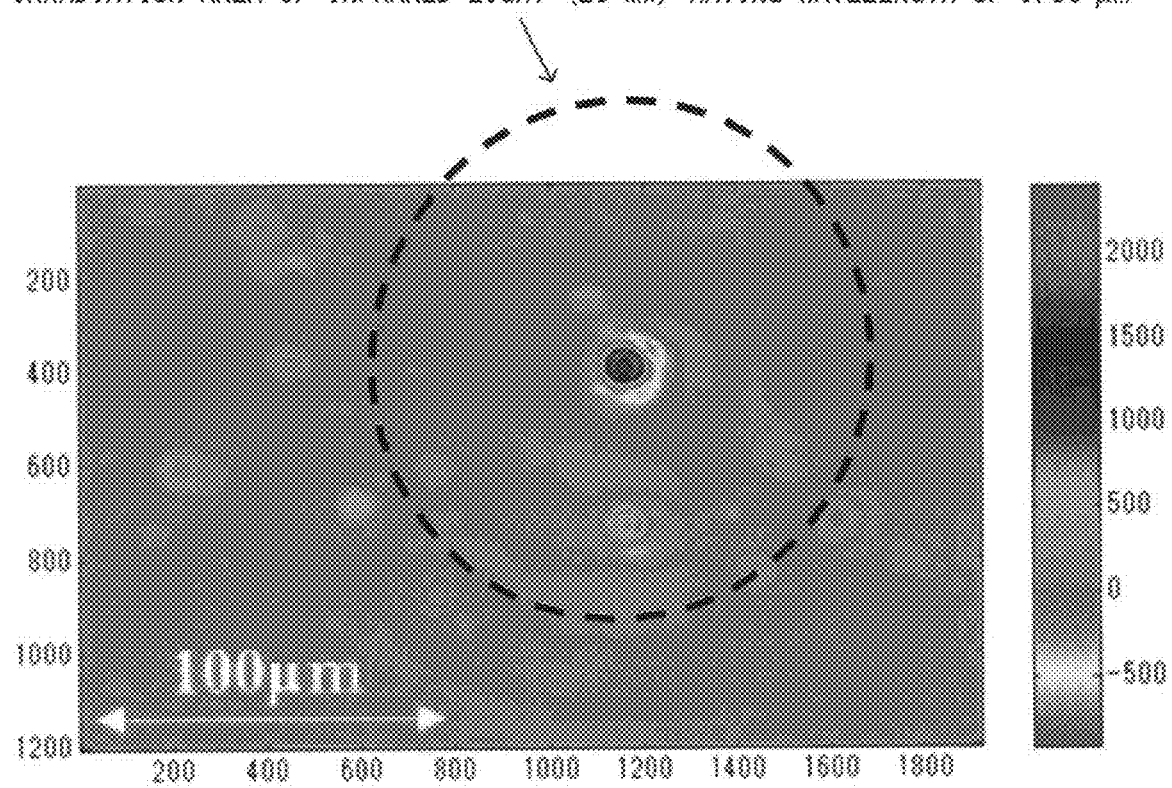
FIG. 13 is a diagram showing an image of silica beads acquired by the image generating apparatus according to the modification 1, and specifically, showing an on-off difference image thereof.

In the present observation, in order to provide infrared light matching the infrared absorption line of the silica beads, the infrared light source was set so as to irradiate the infrared light IR with a wavelength of 9.56 μm, and to irradiate the infrared light IR with an output of 20 mW to the irradiation area indicated by the broken line shown in FIG. 13. In this state, images of the sample were acquired at a frame rate of 1,000 fps while switching on and off the infrared light IR at a frequency of 100 Hz, so as to generate an on image, an off image, and an on-off difference image.

As a result, as shown in FIG. 13, it has been confirmed that, by generating the on-off difference image, this arrangement is capable of visualizing the silica beads even in a case in which the slide glass 130 to be employed is configured as a typical glass member.

It should be noted that, in FIGS. 12 and 13, the pixel coordinate position defined by the image sensor 150 is represented by the vertical axis and the horizontal axis (with the upper-left corner as viewed facing the drawing as (0,0)) as with the examples shown in FIGS. 3 and 4.

Furthermore, in FIG. 12A, the light intensity detected for each pixel region of the image sensor 150 is represented by a 16-bit gradation (i.e., $2^{16}$=65,536 gradations) in the same manner as shown in FIGS. 5 and 6. The scale of the gradation value is indicated by a color bar.

In contrast, in the difference images shown in FIGS. 12B and 13, the difference in the gradation value is simply shown as a visual scale in the form of a color bar.

In the on-off difference image shown in FIG. 13, the infrared light IR irradiation area is indicated by the broken line.

[3.2] Modification 2

First, description will be made with reference to FIGS. 14 and 15 regarding a modification 2 configured as a modification of the image generating apparatus including a differential interference microscope.

Figure 14A:
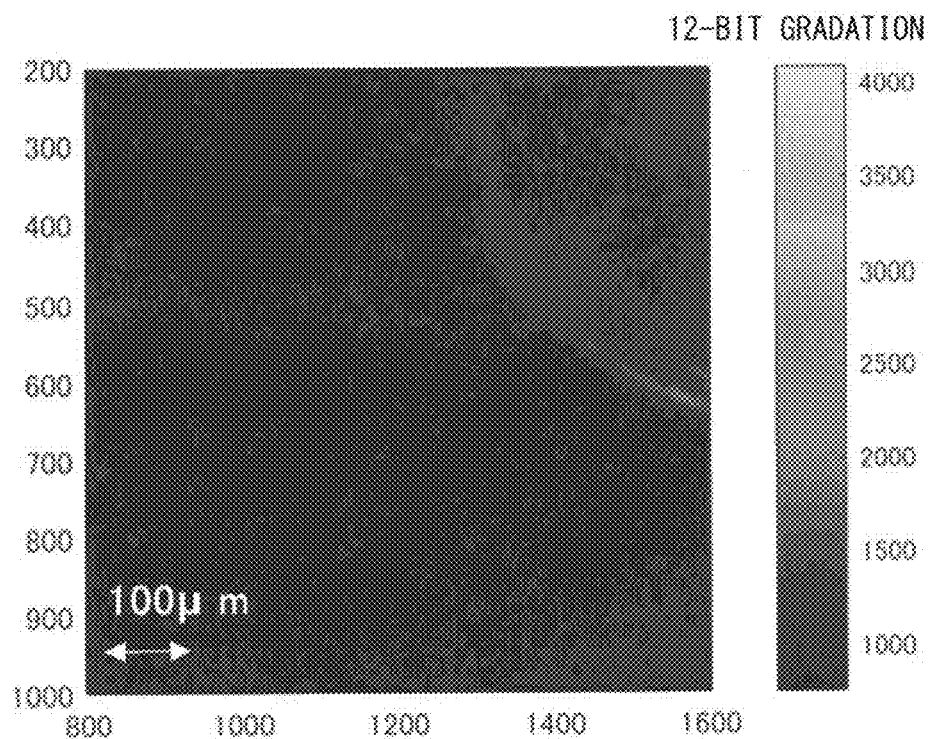
FIG. 14 is a diagram showing an image of silica beads acquired by an image generating apparatus according to a modification 2, and specifically, showing an off image and an off-off difference image thereof.
Figure 14B:
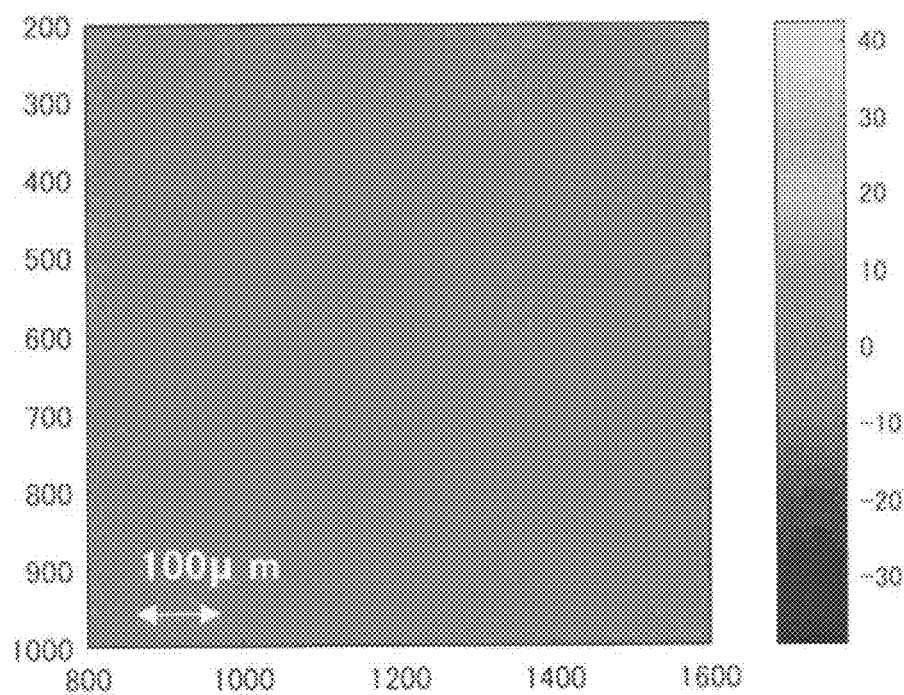

It should be noted that FIG. 14 show images of silica beads acquired by the image generating apparatus including the differential interference microscope according to the present modification, which show an average over 100 frames. Specifically, FIG. 14A is a diagram showing an off image thereof. FIG. 14B is a diagram showing an off-off difference image thereof. FIG. 15 is a diagram showing an on-off difference image of the silica beads acquired by the image generating apparatus including the differential interference microscope according to the present modification, showing an average over 100 frames.

Figure 15:
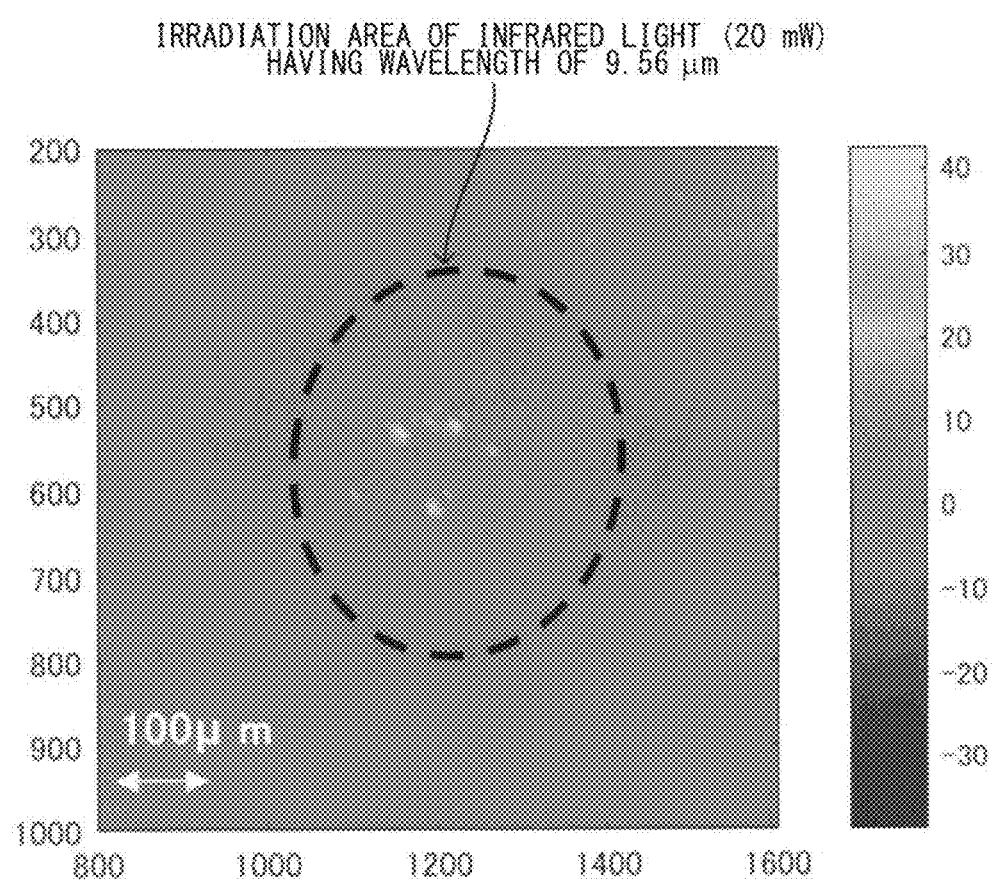
FIG. 15 is a diagram showing an image of silica beads acquired by the image generating apparatus according to the modification 2, and specifically, showing an on-off difference image thereof.

It should be noted that, in FIGS. 14 and 15, the pixel coordinate position defined by the image sensor 150 is represented by the vertical axis and the horizontal axis (with the upper-left corner as viewed facing the drawing as (0,0)) as with the examples shown in FIGS. 3 and 4.

Furthermore, in the off image shown in FIG. 14A, an image is generated with a 12-bit gradation. The scale of the 12-bit gradation is indicated by a color bar. Furthermore, in the difference images shown in FIGS. 14B and 15, the difference in the gradation value is simply shown as a visual scale in the form of a color bar.

In the on-off difference image shown in FIG. 15, the infrared light IR irradiation area is indicated by the broken line.

In the present modification, the image generating apparatus is configured as a differential interference microscope instated of the image generating apparatus according to each embodiment of the present invention configured as a phase contrast microscope or a digital holographic microscope. This is a feature of the present modification.

Specifically, as with each embodiment described above, the image generating apparatus 1 according to the present modification includes, in addition to a conventional differential interference microscope, the infrared light irradiation unit 170 and a mechanism configured to switch on and off the irradiation of the infrared light IR to the sample with a wavelength that corresponds to the infrared absorption line of the observation target material.

Furthermore, the image generating apparatus 1 according to the present modification is provided with the image sensor 150 at a position where an image acquired by the differential interference microscope is formed. Moreover, as in each embodiment described above, the image generating processing unit 160 is provided.

With the image generating apparatus 1 according to the present modification, the image generating processing unit 160 acquires and generates an on image based on a signal output from the image sensor 150 in a state in which irradiation of the infrared light IR to the sample is set to the on state. Furthermore, the image generating processing unit 160 acquires and generates an off image in a state in which irradiation of the infrared light IR is set to the off state.

Furthermore, the image generating processing unit may preferably be configured to calculate the difference in the pixel value for each pixel between the on image and the off image, so as to generate the on-off difference image.

It should be noted that the differential interference microscope, which is a part of the present modification, has the same configuration as that of a conventional differential interference microscope. The image generating apparatus 1 according to the present modification has a configuration in which the functions of the infrared light irradiation unit and the image generating processing unit are newly added to the conventional differential interference microscope.

The image generating apparatus 1 according to the present modification is only required to be configured to generate an on image, an off image, and an on-off difference image while switching on and off the irradiation of the infrared light IR that corresponds to the absorption line of the observation target material to the sample. Accordingly, in the present modification, description of the specific configuration of the apparatus will be omitted.

Also, with the present modification, the image generating processing unit may be provided within the differential interference microscope in the same manner as in each embodiment described above. Also, an external device such as a PC or the like may be coupled to the differential interference microscope via an interface such as USB or the like, so as to allow such an external device to be used as the image generating processing unit. In this case, such an external device may preferably be configured to generate an on image or the like based on a signal supplied from the image sensor.

In order to verify whether or not the image generating apparatus according to the present modification is capable of visualizing the observation target material included in an actual colorless and transparent sample, a two-dimensional image of a sample was acquired and generated in a state in which silica beads having a diameter of 5 μm were mounted on the slide glass together with matching oil having a refractive index of 1.50.

With such an arrangement, the infrared light IR having a wavelength of 9.56 μm that corresponds to the infrared absorption line of the silica beads was irradiated to the sample with an output of 20 mW and at an on/off modulation frequency of 10 Hz, so as to acquire and generate an on image and an off image at a frame rate of 10 fps. Furthermore, an off-off difference image and an on-off difference image are generated. It should be noted that, in the present observation, an exposure time of 10 ms was employed.

As a result, the images as shown in FIGS. 14 and 15 were obtained. As shown in FIG. 14A, it can be confirmed that, in the off state, a differential interference image of the silica beads was obtained. As shown in FIG. 14B, it can be confirmed that, in the off-off difference image, a difference value of zero was obtained for almost all the pixels.

In contrast, as shown in FIG. 15, in the on-off difference image, silica beads stand out in the infrared light IR irradiation region. That is to say, it has been confirmed that the image generating apparatus according to the present modification is capable of detecting a signal that indicates a change in refractive index in a region including the silica beads.

[3.3] Modification 3

First, description will be made with reference to FIGS. 16 and 17 regarding a modification 3 configured as a modification of the image generating apparatus including a bright-field optical microscope. It should be noted that FIG. 16 is a diagram showing an image of muscle tissue of a pig acquired by the image generating apparatus including the bright-field optical microscope according to the present modification. Specifically, FIG. 16 shows an off image and an off-off difference image each representing an average thereof over 100 frames. FIG. 17 is a diagram showing an image of pig muscle tissue acquired by the image generating apparatus including the bright-field optical microscope according to the present modification. Specifically, FIG. 17 shows an on-off difference image thereof averaged over 100 frames.

In FIGS. 16 and 17, the pixel coordinate position defined by the image sensor 150 is represented by the vertical axis and the horizontal axis (with the upper-left corner as viewed facing the drawing as (0,0)) as with the examples shown in FIGS. 3 and 4.

Figure 16A:
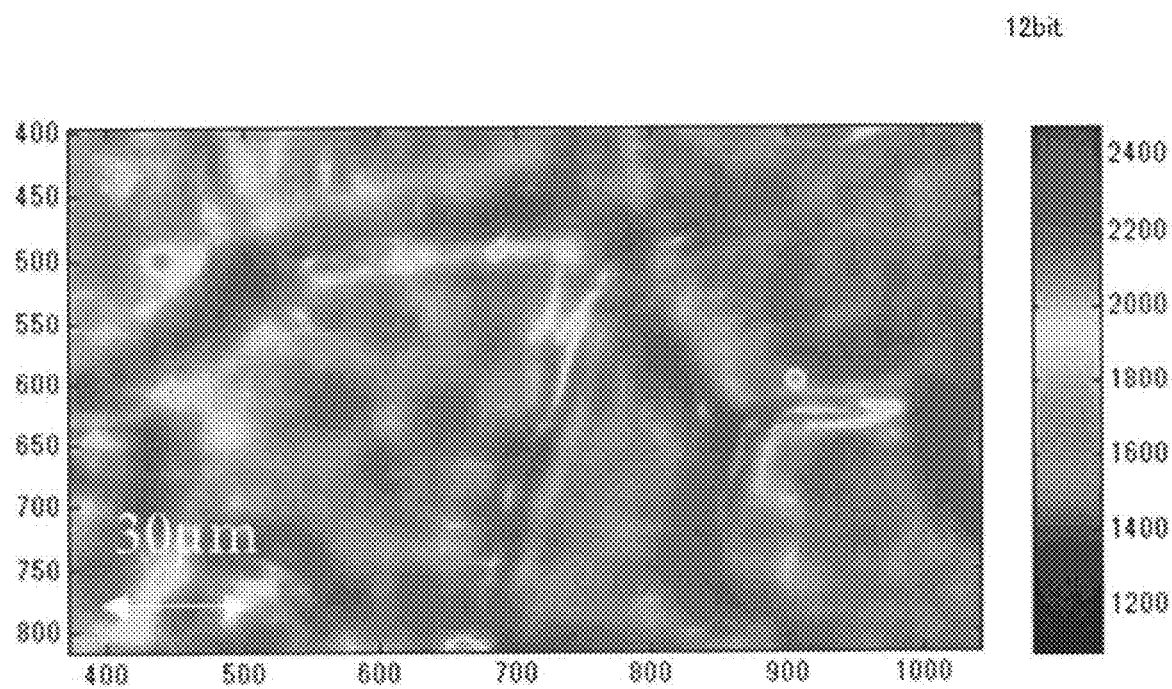
FIG. 16 is a diagram showing an image of pig muscle tissue acquired by an image generating apparatus according to a modification 3, and specifically, showing an off image and an off-off difference image thereof.

Furthermore, the off image shown in FIG. 16A is generated with a 12-bit gradation. The scale of the 12-bit gradation value is indicated by a color bar. In contrast, in the difference images shown in FIGS. 16B and 17, the difference in the gradation value is simply shown as a visual scale in the form of a color bar.

In the on-off difference image shown in FIG. 17, the infrared light IR irradiation area is indicated by the broken line.

In the present modification, the image generating apparatus is configured as a bright-field microscope instaded of the image generating apparatus according to each embodiment of the present invention configured as a phase contrast microscope or a digital holographic microscope. This is a feature of the present modification.

Specifically, as with each embodiment described above, the image generating apparatus 1 according to the present modification includes, in addition to a conventional bright-field microscope, the infrared light irradiation unit 170 and a mechanism configured to switch on and off the irradiation of the infrared light IR to the sample with a wavelength that corresponds to the infrared absorption line of the observation target material.

Furthermore, the image generating apparatus 1 according to the present modification is provided with the image sensor 150 at a position where an image acquired by the bright-field microscope is formed. Moreover, as in each embodiment described above, the image generating processing unit 160 is provided.

With the image generating apparatus 1 according to the present modification, the image generating processing unit 160 acquires and generates an on image based on a signal output from the image sensor 150 in a state in which irradiation of the infrared light IR to the sample is set to the on state. Furthermore, the image generating processing unit 160 acquires and generates an off image in a state in which irradiation of the infrared light IR is set to the off state.

Furthermore, the image generating processing unit may preferably be configured to calculate the difference in the pixel value for each pixel between the on image and the off image, so as to generate the on-off difference image.

It should be noted that the bright-field microscope, which is a part of the present modification, has the same configuration as that of a conventional bright-field microscope according to conventional techniques. The image generating apparatus 1 according to the present modification has a configuration in which the functions of the infrared light irradiation unit and the image generating processing unit are newly added to the conventional bright-field microscope.

The image generating apparatus 1 according to the present modification is only required to be configured to generate an on image, an off image, and an on-off difference image while switching on and off the irradiation of the infrared light IR that corresponds to the absorption line of the observation target material to the sample. Accordingly, in the present modification, description of the specific configuration of the apparatus will be omitted.

In order to verify whether or not the image generating apparatus according to the present modification is capable of visualizing an observation target material included in an actual colorless and transparent sample, a slice of pig muscle tissue having a thickness of 10 μm was mounted on the slide glass.

In this state, infrared light IR having a wavelength of 6.07 μm that corresponds to the C=O stretching vibration (amide I band) that occurs in peptide bonds in proteins was irradiated with an output of 7 mW at an on/off modulation frequency of 4 Hz, so as to acquiring and generate an on image and an off image at a frame rate of 8 fps. Furthermore, an off-off difference image and an on-off difference image were generated. It should be noted that, in the present observation, an exposure time of 0.3 ms was employed.

Figure 16B:
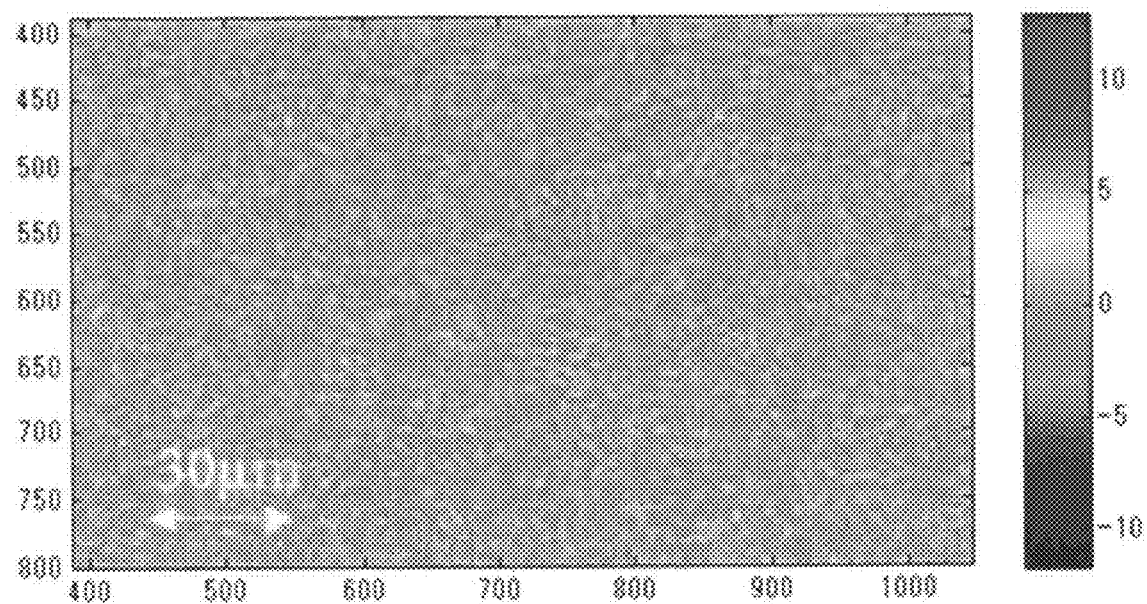
Figure 17:
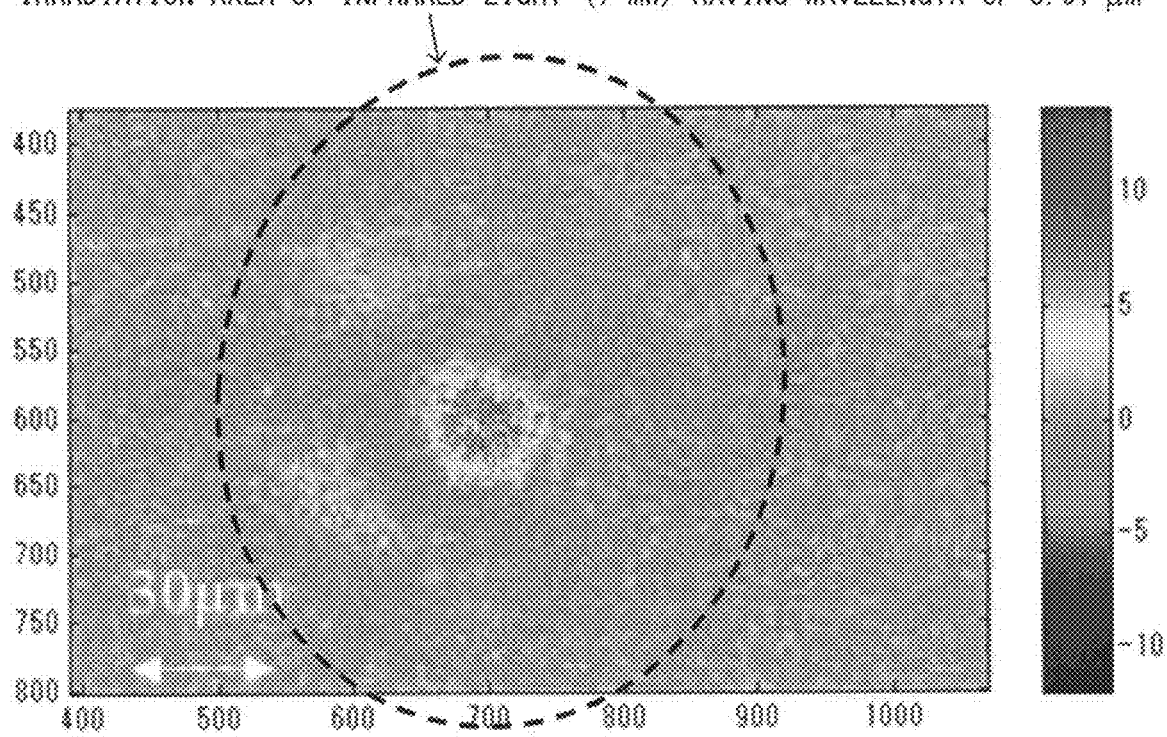
FIG. 17 is a diagram showing an image of pig muscle tissue acquired by the image generating apparatus according to the modification 3, and specifically, showing an on-off difference image thereof.

As a result, results were obtained as shown in FIGS. 16 and 17. It should be noted that, as shown in FIGS. 16A and 16B, with the off image and the off-off difference image, such an image does not allow specific visualization of only a particular protein included in the pig muscle tissue.

In contrast, as shown in FIG. 17, in the on-off difference image, the observation target protein included in the muscle tissue is displayed in an infrared light IR irradiation region such that it stands out. That is to say, it can be confirmed that the bright-field optical microscope according to the present modification is also capable of visualizing the observation target material.

It should be noted that the present modification is also applicable to a dark-field optical microscope in addition to such a bright-field optical microscope.

In this case, such a dark-field optical microscope is provided with an infrared light irradiation unit, an image sensor, and an image generating unit. Also, the image generating processing unit may preferably be configured to generate an on image, an off image, and an on-off difference image based on a signal supplied from the image sensor in synchronization with the on/off switching of the infrared light IR irradiation to the sample.

This arrangement also allows a colorless and transparent observation target material in a sample to be visualized with a dark-field optical microscope.

[3.4] Modification 4

In each of the above embodiments and modifications, infrared light irradiation to the sample is switched on and off in order to detect the change in polarization direction of the transmitted light that occurs due to the anisotropic refractive index (birefringence) that occurs in the observation target material accompanying molecular vibration absorption, so as to visualize the observation target material in the sample. This is the point in difference from each embodiment or modification described above configured to switch the infrared light irradiation on and off in order to detect a change in the physical properties of the observation target material that occurs in the sample based on the phase distribution or the intensity distribution of the irradiation light IL that has passed through the sample, so as to generate the on image, the off image, and the on-off difference image.

In this case, the irradiation of the infrared light IR (infrared light that corresponds to the infrared absorption line of the observation target material) to the sample may be switched on and off, and the image generating processing unit may generate an on image and an off image based on a signal supplied from the image sensor in the on state and the off state. Also, the image generating processing unit may calculate the difference in the pixel value for each pixel between the on image and the off image, so as to generate the on-off difference image.

This arrangement is capable of detecting the birefringence of the observation target material in the sample, thereby allowing the observation target material to be visualized.

[3.5] Modification 5

Description has been made above in each embodiment and each modification regarding an example in which the image generating apparatus is configured as a transmission optical microscope. Also, the image generating apparatus according to the present modification may be configured as a reflection digital holographic microscope, phase contrast microscope, differential interference microscope, or brightfield or dark-field optical microscope.

In this case, the reflectance of the observation target material in the sample changes due to molecular vibration absorption. This arrangement is also capable of visualizing the observation target material based on the phase distribution or the like of the reflected light.

[3.6] Modification 6

With the present modification, the on image and the off image are generated while scanning the wavelength of the infrared light IR emitted from the infrared light source in a predetermined wavelength range (e.g., in a range between 750 nm and 10,000 nm), which is a difference from the embodiments and modifications described above in which a controller (not shown) of the infrared light source 171 controls the light source such that it emits the infrared light IR with a single wavelength fixed according to an instruction from the user.

In particular, in the present modification, in the scanning of the waveform of the infrared light IR emitted from the light source (not shown) of the infrared light source 171, the timings at which the infrared light IR is switched on and off may be determined as desired in order to generate the on image, off image, and on-off difference image.

For example, the irradiation of the infrared light IR may be switched on and off at every timing at which the wavelength of the infrared light IR is changed by a predetermined amount, e.g., 10 nm, 50 nm, 100 nm, or the like. Also, the controller may output an image generating instruction command to the image sensor 150 and the image generating processing unit 160 at the on timing and the off timing of the infrared light IR, so as to generate the on image and the off image at the command input timings. Also, the on-off difference image may be generated based on the difference in the pixel value for each pixel between the on image and the off image.

Also, the wavelength of the infrared light IR emitted from the infrared light source 171 may be scanned at a predetermined scanning rate. Also, the emission of the infrared light IR may be switched on and off at predetermined time intervals (intervals of 2 ms, for example). Also, the on image, the off image, and the on-off difference image may be generated by the image sensor 150 and the image generating processing unit 160 in synchronization with the timing.

In a case in which the on image, the off image, and the on-off difference image are generated while scanning the wavelength according to the present modification, in order to observe the observation target material in the sample, the wavelength of the infrared light IR emitted from the infrared light source 171 is preferably fixed to a condition in which the observation target material can be visualized with the highest contrast (i.e., a condition in which the wavelength of the infrared light IR matches the infrared absorption line of the observation target material).

It should be noted that such an operation may be supported using a desired method. Such an arrangement may be configured to allow the user to perform a predetermined input operation (e.g., a predetermined operation for operating an external device such as a PC or the like that forms the image generating processing unit 160) at a timing at which the target material in the sample is most clearly visualized on an unshown monitor in a monitoring operation in which the user monitors the on-off difference image displayed on the monitor, so as to fix the wavelength of the infrared light IR emitted from the infrared light source 171.

Also, such an arrangement according to the present modification may be configured to identify a material included in the sample based on the on-off difference image generated by the image generating processing unit 160.

That is to say, in a state in which the wavelength of the infrared light IR irradiated to the sample does not match the infrared absorption line of the target material in the sample, almost no molecular vibration absorption occurs in the sample. Accordingly, physical properties such as the refractive index, etc. do not change in the target material.

Accordingly, in this state, there is no difference between the on image and the off image. In a case of generating the on-off difference image, the pixel value becomes a value in the vicinity of zero for each pixel of the image. Accordingly, the target material in the sample is not visualized.

Accordingly, for example, the on-off difference image is generated in a state in which the infrared light IR is irradiated while changing the wavelength of the infrared light IR in units of several nm (e.g., 1 to 5 nm). The on-off difference image thus generated is subjected to predetermined image processing (e.g., edge detection processing or the like) so as to quantify the contrast of an object displayed in the image. This arrangement is capable of identifying the on-off difference image in which the target material in the sample is most effectively visualized.

With such an arrangement, molecular information with respect to a material included in the sample may preferably be identified based on the wavelength of the infrared light IR when the on-off difference image is generated.

In particular, the infrared absorption spectrum is known for each material in FTIR spectroscopy or the like. This allows the molecular information with respect to a material included in the sample to be identified based on the wavelength of the infrared light IR when the on-off difference image is generated under a condition in that the target material included in the sample can be visualized.

In this case, data that represents the correspondence relation between the wavelength of the infrared light IR and each material may be stored beforehand in the image generating processing unit 160 or an external recording apparatus in the form of a database. Also, the image generating processing unit 160 may automatically identify a material included in the sample based on the data stored in the database and the wavelength of the infrared light IR when the on-off difference image thus specified is generated. Also, information with respect to the material thus identified (e.g., material name, chemical formula, physical properties, etc.) may be displayed on the monitor.

It should be noted that the database may be provided within the image generating apparatus. Also, an external device (e.g., a server apparatus or the like on an unshown network, or the like) may include the database. In this case, the data may be acquired from the external device as necessary. Also, an image generated by the image generating apparatus may be transmitted to the external device. Also, the material included in the sample may be identified by the external device side. Also, the information with respect to the material thus identified may be delivered.

[3.7] Modification 7

Description has not been made in each embodiment and each modification described above regarding whether or not the infrared light source 171 is configured as a monochrome infrared light source that irradiates infrared light at a single wavelength. However, the infrared light source 171 to be employed may be configured to output the infrared light IR with a wide spectrum width.

Also, in a case of employing the infrared light IR having a broadband spectrum, the infrared light IR may be irradiated to the sample after the broadband infrared light IR is introduced to a scanning Michelson interferometer.

In this case, a phase difference image or an interference image is acquired by the image generating apparatus 1 or 2 every time the position of a scanning mirror is changed.

Subsequently, the data sequence acquired for each pixel is subjected to a Fourier transform so as to calculate the spectrum for each pixel. In other words, in a case of employing this method, modulation of the polychromatic infrared light IR is encoded using a Michelson interferometer, and the acquired data is decoded using a Fourier transform.

[3.8] Modification 8

In each embodiment and each modification described above, an arrangement is employed configured to generate the on image and the off image, and to calculate the difference in the pixel value for each pixel between the on image and the off image, so as to visualize the observation target material included in the sample.

In contrast, in the present modification, a first on image is generated in a state in which first infrared light (e.g., infrared light IR having a wavelength of 9.56 µm which corresponds to the infrared absorption line of silica) is irradiated. Furthermore, a second on image is generated in a state in which second infrared light (e.g., infrared light IR having a wavelength of 6.07 µm which corresponds to the molecular vibration absorption due to the amide I band which corresponds to the C=O stretching vibration that occurs in peptide bonds in proteins) that differs from the first wavelength is irradiated.

It should be noted that the first infrared light and the second infrared light according to the present modification respectively correspond to a "first stimulus input infrared light" and a "second stimulus input infrared light" disclosed in the "appended claims".

In a case in which silica beads are employed as the observation target material, even when the second infrared light is irradiated, this causes no molecular vibration absorption in silica. Accordingly, even when the second infrared light is irradiated, this causes no change in the physical properties of the silica, or if such a change does occur, it is minimal.

Accordingly, the second on image is generated with pixel values that are close to those of an off image.

With the present modification, based on the mechanism described above, the first on image and the second on image are generated in synchronization with the repeated switching of the wavelength of the infrared light IR irradiated to the sample from the infrared light irradiation unit 170 between the first wavelength and the second wavelength (i.e., while repeatedly switching the infrared light IR irradiated from the infrared light irradiation unit 170 to the sample between the first infrared light and the second infrared light).

Subsequently, the difference in the pixel value is calculated for each pixel between the first on image and the second on image so as to generate a two-dimensional image of the sample with the pixel components due to materials that differ from the observation target material included in the first on image being removed. This arrangement allows the present modification to visualize the observation target material included in the sample. It should be noted that a specific apparatus configuration that supports a function according to the present modification can be provided by the same configurations according to the embodiments and modifications described above.

It should be noted that, in order to provide the function of the present modification, the wavelength of the infrared light IR irradiated to the sample from the infrared light irradiation unit 170 is required to be repeatedly switched. Accordingly, the infrared light source 171 included in the infrared light irradiation unit 170 is provided with a controller (not shown) configured to switch the wavelength of the infrared light. Such an arrangement is required to be configured to allow the controller to switch the wavelength of the infrared light IR irradiated from the infrared light source 171 between the first wavelength and the second wavelength. Furthermore, the light chopper 172 and the on/off control unit 173 are omitted from the infrared light irradiation unit 170. In the present modification, the first wavelength is required to be set to a value that corresponds to the infrared absorption line of the observation target material. In contrast, a specific value of the second wavelength is not restricted in particular so long as it differs from the first wavelength.

In a case of employing two (or more) colors of infrared light IR (e.g., first infrared light and second infrared light), an arrangement may be employed in which the two or more colors of infrared light IR are controlled with different respective on/off modulation frequencies, and are irradiated to the sample at the same time.

In this case, the first on images and the second on images are continuously acquired such that the modulation frequency applied for each color of the first infrared light and the second infrared light is encoded. The encoded data can be decoded by executing processing such as a Fourier transform or the like.

[3.9] Modification

In each embodiment and each modification described above, an arrangement is employed configured to generate an on image and an off image, and to calculate the difference in the pixel value for each pixel between the on image and the off image so as to generate an on-off difference image, thereby visualizing an observation target material included in a sample. Also, in a case of irradiating the infrared light to the sample with different intensities, this provides a difference in the change of physical properties (e.g., change in refractive index or the like) that occurs in the observation target material included in the sample even in a case in which the irradiated infrared light IR is maintained at the same wavelength. Accordingly, the change in phase or the like is in proportion to the change in the physical properties.

In the present modification, based on the mechanism described above, a first on image is generated in a state in which a first infrared light having a first intensity (e.g., infrared light IR of 5 mW or the like) is irradiated. Furthermore, a second on image is generated in a state in which a second infrared light having a second intensity (e.g., infrared light IR of 10 µW or the like) is irradiated.

It should be noted that the first infrared light and the second infrared light according to the present modification respectively correspond to a "first stimulus input infrared light" and a "second stimulus input infrared light" disclosed in the "appended claims".

With such an arrangement, the first on image and the second on image are generated while repeatedly switching the intensity of the infrared light IR irradiated to the sample from the infrared light irradiation unit 170 between the first intensity and the second intensity, so as to calculate the difference in the pixel value for each pixel between the first on image and the second on image. With this arrangement, the present modification is capable of removing the pixel components due to materials that differ from the observation target material included in the first on image, thereby allowing the observation target material included in the sample to be visualized. It should be noted that a specific apparatus configuration that supports a function according to the present modification can be provided by any of the same configurations according to the embodiments and modifications described above.

It should be noted that, in order to provide the function according to the present modification, there is a need to repeatedly switch the intensity of the infrared light irradiated to the sample from the infrared light irradiation unit 170. Accordingly, the infrared light source 171 included in the infrared light irradiation unit 170 is required to include a controller (not shown) configured to switch the intensity of the infrared light. Such an arrangement is required to be configured to allow the controller to repeatedly switch the intensity of the infrared light IR irradiated from the infrared light source 171 between the first intensity and the second intensity. Furthermore, the light chopper 172 and the on/off control unit 173 are omitted from the infrared light irradiation unit 170.

[3.10] Modification 10

Description has not been made in particular in each embodiment described above regarding whether the phase contrast microscope or the digital holographic microscope is configured as a finite correction optical system or an infinite correction optical system. In a case in which the image generating apparatus 1 or 2 is configured as an infinite correction optical system, the image generating apparatus 1 or 2 configured as the phase contrast microscope or the digital holographic microscope may be provided with an imaging lens as an additional component.

In a case in which the image generating apparatus 1 employing a phase contrast microscope is configured as an infinite correction optical system (in a case of employing a configuration according to the first embodiment), in the image generating apparatus 1 shown in FIG. 1, an imaging lens may preferably be arranged between the objective lens unit 140 and the image sensor 150 such that their optical axes are aligned with each other. With this arrangement, an image is formed on the focal plane, thereby providing an infinite correction optical system.

On the other hand, in a case in which the image generating apparatus 2 employing a digital holographic microscope is configured as an infinite correction optical system (in a case of employing a configuration according to the second embodiment), in the image generating apparatus 1 shown in FIG. 11, an imaging lens may preferably be arranged between the objective lens 141 and the beam splitter 207 such that their optical axes are aligned with each other. Furthermore, another imaging lens may preferably be arranged between the beam expander 205 and the beam splitter 207 such that their optical axes are aligned with each other.

[3.11] Modification 11

In each embodiment and each modification described above, as a light source for the irradiation light IL, the light source 110 that generates visible light or the single-frequency visible light laser 201 is employed. Also, as the light source for the irradiation light IL, a light source configured to generate irradiation light IL in an ultraviolet region wavelength range may be employed. Also, such an arrangement may be configured to execute imaging (generate an image) of a sample including the observation target material using the irradiation light IL in such an ultraviolet range.

In this case, a light source configured to generate any one from among UVA with a wavelength of 380 to 315 nm, UVB with a wavelength of 315 to 280 nm, UVC with a wavelength that is equal to or greater than 200 nm and is smaller than 280 nm, near ultraviolet (near UV) with a wavelength of 380 to 200 nm, far ultraviolet (far UV (FUV)) or vacuum UV (VUV) with a wavelength of 200 to 10 nm, and extreme ultraviolet UV (extreme UV (EUV) or XUV) with a wavelength of 121 to 10 nm is arranged at a position of the light source 110 or the single-frequency visible light laser 201.

In this case, the image sensor 150 to be employed may preferably be configured to receive ultraviolet light in the wavelength range thus generated by the light source described above, and to generate an electric signal. Also, the image generating processing unit 160 may be configured to generate an on image, an off image, an on-off difference image, etc., based on the electric signal generated by the image sensor 150. It should be noted that, as the image sensor that generates an electric signal based on the ultraviolet-range light, a conventionally available image sensor may be employed as it is.

Basically, the spatial resolution depends on the wavelength of the irradiation light IL. In a case of employing a short-wavelength irradiation light IL, this provides high spatial resolution. Accordingly, such an arrangement according to the present modification allows the observation target material in the sample to be visualized in a sure manner with high spatial resolution on the order of several hundred nm to several nm.

Furthermore, the light source for the irradiation light IL to be employed may be configured to generate the irradiation light IL in a near-infrared region. Also, such an arrangement may be configured to execute imaging (generate an image) of the sample including the observation target material using the irradiation light IL in the near-infrared region.

It should be noted that, in a case of employing such a near-infrared light as the irradiation light IL, molecular vibration absorption occurs in the observation target material due to the near-infrared light employed as the irradiation light IL. Such an arrangement is required to prevent the occurrence of noise in an image acquired by the image generating apparatus.

Here, the stimulus input infrared light IR is required to match the molecular vibration absorption. Accordingly, the wavelength of the stimulus input infrared light IR is restricted to a wavelength range that involves the molecular vibration absorption. A typical molecule has a normal vibration only in a wavelength range that is equal to or greater than 2.7 μm. Accordingly, in a case of employing mid-infrared light having a wavelength of 2.7 μm or more, in some cases, the infrared light absorption line of the observation target material overlaps with a part of the spectrum. Such an arrangement has the potential to involve absorption of the irradiation light IL by the observation target material.

In order to solve such a problem, in a case in which such near-infrared light is employed as the irradiation light IL, a light source configured to irradiate near-infrared light with a wavelength of 2.7 μm or less is arranged at a position of the light source 110 or the single-frequency visible light laser 201 such that it does not overlap with the molecular infrared absorption line. That is to say, with such an arrangement, the near-infrared light to be employed as the irradiation light IL is required to have a wavelength that is smaller than 2.7 μm.

It should be noted that, in a case in which the near-infrared light is employed as the irradiation light IL, the near-infrared light to be employed is required to have a wavelength range that allows the image sensor 150 to detect it with sufficient sensitivity. Accordingly, in a case of employing an image sensor formed of Si, the near-infrared light to be employed is required to have a wavelength range up to on the order of 1.1 μm. In a case of employing an InGaAs image sensor, the near-infrared light to be employed is required to have a wavelength range up to on the order of 1.7 μm. Depending on the material of the image sensor, the near-infrared light to be employed is required to have a wavelength range up to on the order of 2.2 μm. It should be noted that, by employing the image sensor 150 formed of a different material, such an arrangement may be configured to support the irradiation light IL having other wavelengths.

In this case, the image sensor 150 to be employed may preferably be configured to receive the near-infrared light generated by the light source described above, so as to generate an electric signal. Also, an on image, an off image, an on-off difference image, etc. may preferably be generated based on the electric signal generated by the image sensor 150.

With this arrangement, the observation target material included in a sample can be visualized in the form of an image using near infrared light having a wavelength that is shorter than that of infrared light to be employed in infrared spectroscopic imaging. This allows an image to be acquired and generated with higher spatial resolution than that provided by infrared spectroscopic imaging.

[3.12] Modification 12

Also, the image generating apparatus according to the present invention may be configured such that the infrared light irradiation unit 170, the image sensor 150, and the image generating processing unit 160 are provided to an arbitrary quantitative phase microscope. By generating an on image, off image, and on-off difference image, this arrangement may be configured to be capable of visualizing an observation target material in a sample.

In this case, the on image, off image, and on-off difference image may be generated by applying the techniques of holography and the techniques of quantitative phase imaging, using broadband irradiation light IL. This arrangement provides improved image quality due to reduction of coherence noise such as speckle, multireflection, or the like. In addition, this arrangement allows high-power light to be employed, thereby allowing the image acquisition speed to be raised.

[4] Third Embodiment

[4.1] Configuration

Figure 18:
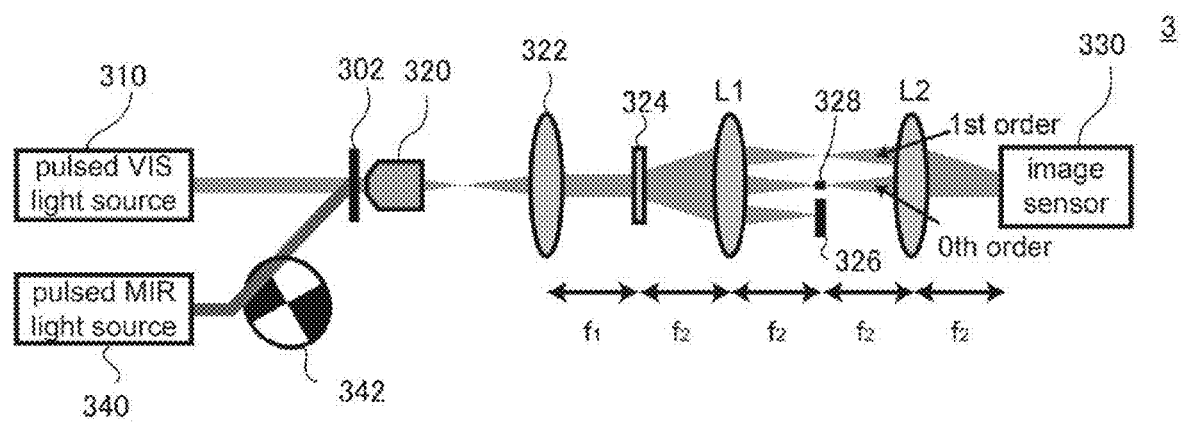
FIG. 18 is a block diagram showing a configuration of an image generating apparatus according to a third embodiment.

FIG. 18 is a block diagram showing a configuration of an image generating apparatus 3 according to a third embodiment. The image generating apparatus 3 is configured as a digital holographic microscope.

A pulsed visible light source 310 generates a visible-range laser beam with a pulse width of several s or less, and irradiates the laser beam to a sample 302 in the form of collimated light. The microscope information is focused on the objective lens 320, and is provided in the form an image on a grating 324 by means of a tube lens 322. The light diffracted by the grating 324 is focused by a lens L1. A pinhole 328 is provided on a focal plane of the lens L1, which functions as a spatial filter that allows the 0th order diffracted light to pass through. The 0th order diffracted light is generated in the form of a plane wave by means of a lens L2 arranged as a subsequent component. The other diffracted light except for the 1st order diffracted light is blocked by a beam block 326. The 1st order diffracted light passes through the lenses L1 and L2, which transfers the image information on the grating 324 plane to an image acquisition plane of the image sensor 330. The 1st order light and the 0th order light are superimposed on the image acquisition plane of the image sensor 330, which generates an interference pattern. The image sensor 330 records the interference patten as image information. By subjecting the interference image to calculation processing, such an arrangement is capable of acquiring phase information with respect to the sample 302.

A pulsed mid-infrared light source 340 generates a mid-infrared region laser beam with a pulse width of several s or less, and irradiates the laser beam thus generated to the sample 302. This induces photothermal effects in a molecular vibration selective manner. A synchronization chopper (shutter) 324 is inserted in a light path of the mid-infrared beam.

Figure 19:
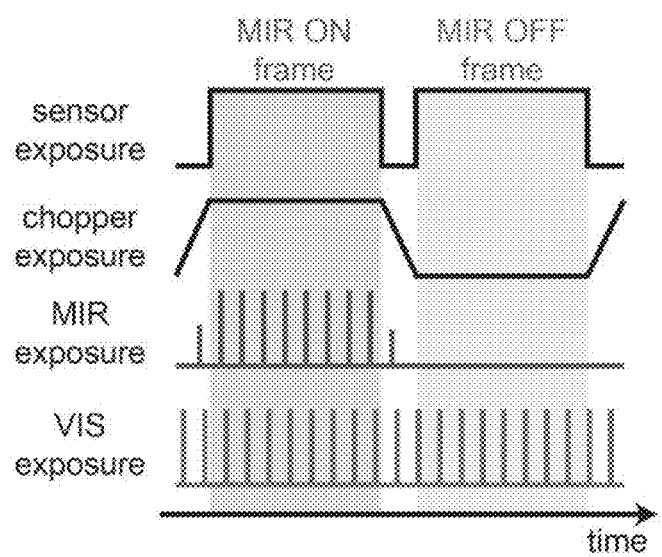
FIG. 19 is a time chart for explaining the operation of the image generating apparatus shown in FIG. 18.

FIG. 19 is a time chart for explaining the operation of the image generating apparatus 3 shown in FIG. 18. During a period in which the chopper 342 is opened, a mid-infrared (MIR) pulse is irradiated to the sample 302, which induces the photothermal effects. During a period in which the chopper 342 is closed, the mid-infrared pulse is blocked. That is to say, the mid-infrared pulse is not irradiated to the sample 302.

Immediately after the irradiation of the mid-infrared pulse, a visible light (VIS) pulse generated by the pulsed visible light source 310 is irradiated so as to scan the information with respect to the sample 302 in an excited state that occurs due to the photothermal effect. On other hand, the chopper 342 applies ON/OFF modulation to the mid-infrared beam with a rate that is half the frame rate of the image sensor 330. Accordingly, the image sensor 330 alternately acquires images of the sample 302 (on images and off images) in the on state and the off state of the photothermal effect. By detecting the difference between the on image and the off image, this arrangement is capable of generating an image of the sample 302 in a molecular vibration selective manner.

[4.2] Results of Sample Observation by Means of Image Generating Apparatus 3

Description will be made regarding results obtained by measuring several samples by means of the image generating apparatus 3 shown in FIG. 18.

[4.2.1] Observation of Oil

In the first example, a sample to be employed was configured as oil interposed between a pair of calcium fluoride substrates each having a thickness of 500 μm. The pulsed mid-infrared light source 340 to be employed was configured as a 1-μs pulsed mid-infrared light source with a wavelength controllable in a range between 1440 to 1640 cm$^{-1}$. The pulsed visible light source 310 to be employed was configured as a pulsed light source with a wavelength of 520 nm and pulse width of 130 ns. The mid-infrared light and the visible light pulses were irradiated with a repetition rate of 1 kHz. The image sensor 330 was operated with a frame rate of 60 Hz.

Figure 20A:
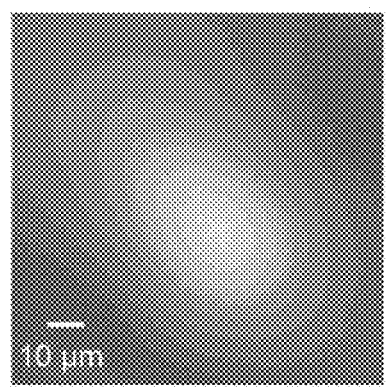
FIGS. 20A through 20D are diagrams showing measurement results with respect to oil obtained by the image generating apparatus shown in FIG. 18.

FIGS. 20A through 20D are diagrams showing oil measurement results obtained by the image generating apparatus 3 shown in FIG. 18. FIG. 20A shows a mid-infrared OFF-ON difference image of the sample 302. Mid-infrared light of 1501 cm$^{-1}$ was employed. The image pattern represents a mid-infrared light focusing profile on the sample face. The central portion exhibits a phase shift of approximately 60 mrad.

Figure 20B:
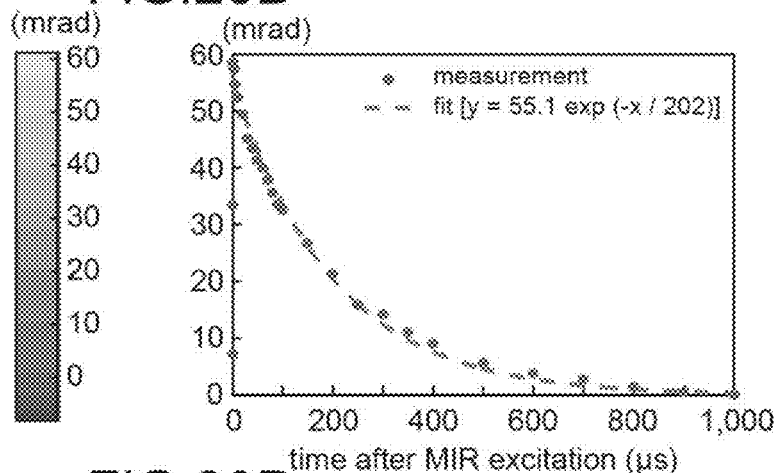

FIG. 20B shows the temporal change of the phase shift due to the photothermal effect. Specifically, FIG. 20B shows a plot of the change in the phase shift due to the photothermal effect in a case in which the time delay between the mid-infrared pulse and the visible light pulse was scanned. Each data point represents a point that corresponds to the central portion of the mid-infrared light focusing profile. It can be understood that the temporal change represents an exponential attenuation, and that the phase shift attenuates to zero in a period on the order of 1 ms.

Figure 20C:
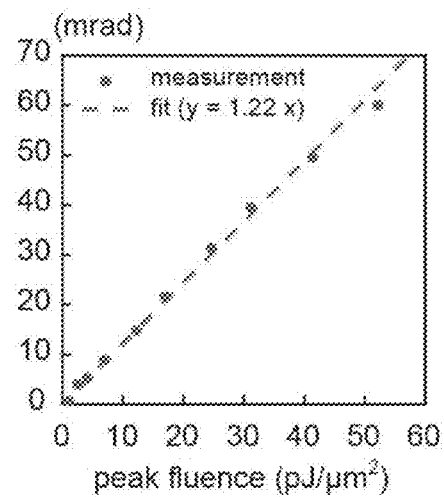
Figure 20D:
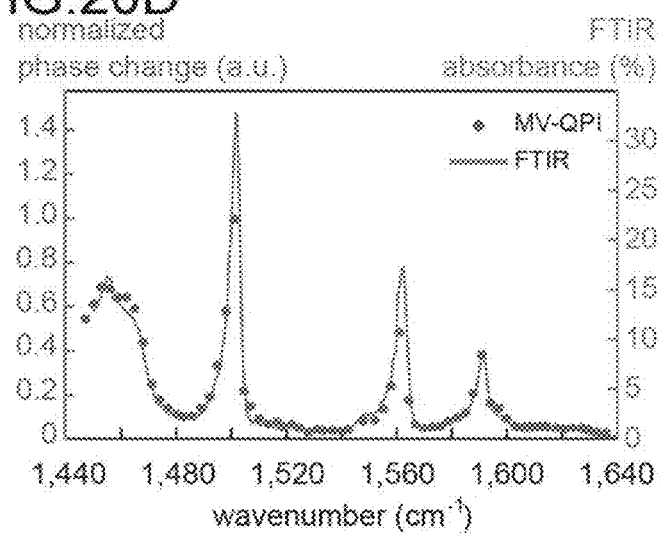

FIG. 20C shows a relation between the intensity of the mid-infrared light and the phase shift that occurs due to the photothermal effect. It can be understood that the relation between them is a linear relation. FIG. 20D shows a mid-infrared spectroscopic spectrum obtained by the system thus configured. The phase shift due to the photothermal effect obtained for each wavelength was measured while scanning the wavelength of the mid-infrared light. The phase shift thus measured was normalized by the pulse energy of the mid-infrared light for each wavelength. It has been found that the spectrum thus obtained has a shape that is similar to the spectrum waveform obtained with an Attenuated Total Reflection (ATR) Fourier transform infrared spectroscopy (FTIR) apparatus.

[4.2.2] Observation of Microbeads

In the next example, the sample to be employed was configured as polystyrene beads and porous silica beads each having a diameter on the order of 5 μm arranged such that they adhered to a calcium fluoride substrate and such that a space around each bead was filled with a contact liquid having a refractive index of 1.56, which were mounted such that they were interposed between a pair of calcium fluoride substrates having a thickness of 500 μm.

In order to provide mid-infrared light, a pulsed light source configured to irradiate mid-infrared light with a wavenumber of 1045 cm$^{-1}$ and with a pulse width of 5 μs was employed. Mid-infrared light having such a wavelength resonates with the Si—O—Si vibration of silica. In order to provide visible light, a pulsed light source configured to irradiate pulses of light with a wavelength of 520 nm and with a pulse width of 130 ns was employed. The mid-infrared light and the visible light pulses were irradiated with a repetition rate of 1 kHz. The image sensor 330 was operated with a frame rate of 60 Hz.

Figure 21A:
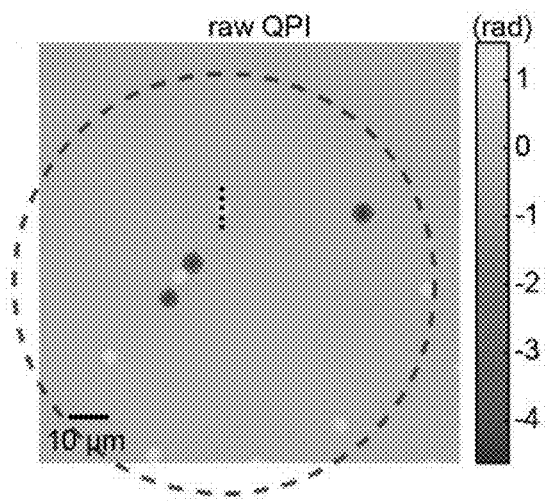
FIGS. 21A through 21D are diagrams showing measurement results with respect to microbeads obtained by the image generating apparatus shown in FIG. 18.
Figure 21B:
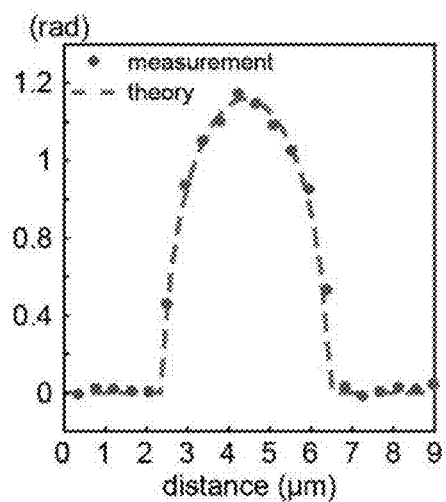
Figure 21C:
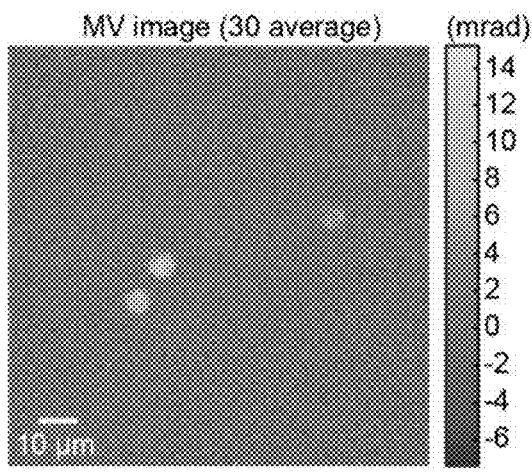
Figure 21D:
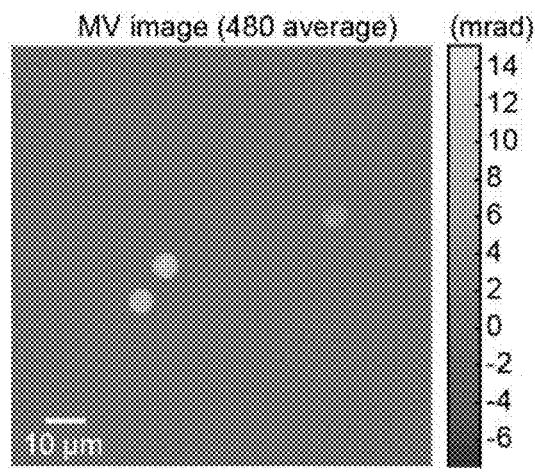

FIGS. 21A through 21D are diagrams showing results of measurement of microbeads obtained by the image generating apparatus 3 shown in FIG. 18. FIG. 21A shows a phase image of the sample 302 in the off state of the mid-infrared light. The mid-infrared light is irradiated to the region indicated by a dotted frame. The polystyrene beads are each displayed with positive contrast. In contrast, the porous silica beads are each displayed with negative contrast. FIG. 21B shows quantitative verification results with respect to the phase. Specifically, the phase was plotted along the cross-section of a polystyrene bead (along the black broken line in the image in FIG. 21A), which has been confirmed to match the theoretical curve. FIGS. 21C and 21D each show an OFF-ON difference image. FIG. 21C shows the average results over 30 measurements acquired with a measurement period of 1 second. FIG. 21D shows the average results over 480 measurements acquired with a measurement period of 16 seconds. It has been confirmed that a phase shift occurs due to the photothermal effect only in a region including each silica bead in a selective manner.

[4.2.3] Observation of Biological Sample

In the next example, the sample to be employed was configured as living cells (cos 7) in a culture mounted such that it was interposed between a pair of calcium fluoride substrates each having a thickness of 500 μm. In order to provide the mid-infrared light, a pulsed light source to be employed was configured to irradiate mid-infrared light with a wavenumber of 1530 cm$^{-1}$ and with a pulse width of 1 μs. This matches the wavelength that corresponds to so-called amide II molecular vibration of peptide bonds in proteins, which was employed in order to visualize the protein distribution in the cells. In order to provide the visible light, a pulsed light source to be employed was configured to irradiate visible light with a wavelength of 532 nm and with a pulse width of 10 ns. The mid-infrared light and the visible light pulses were irradiated at a repetition frequency of 1 kHz. The image sensor 330 was operated with a frame rate of 100 Hz. An image was acquired by integrating (averaging) over 5,000 times. This arrangement requires a measurement period of 100 seconds.

FIGS. 22A and 22B are diagrams showing the results of measurement of the biological sample obtained by the image generating apparatus 3 shown in FIG. 18. FIG. 22A shows a phase image of the sample 302 in the off state of the mid-infrared light. FIG. 22B shows an OFF-ON difference image of the mid-infrared light. This allows the protein distribution in the cells to be visualized.

[5] Fourth Embodiment

[5.1] Configuration

Figure 23:
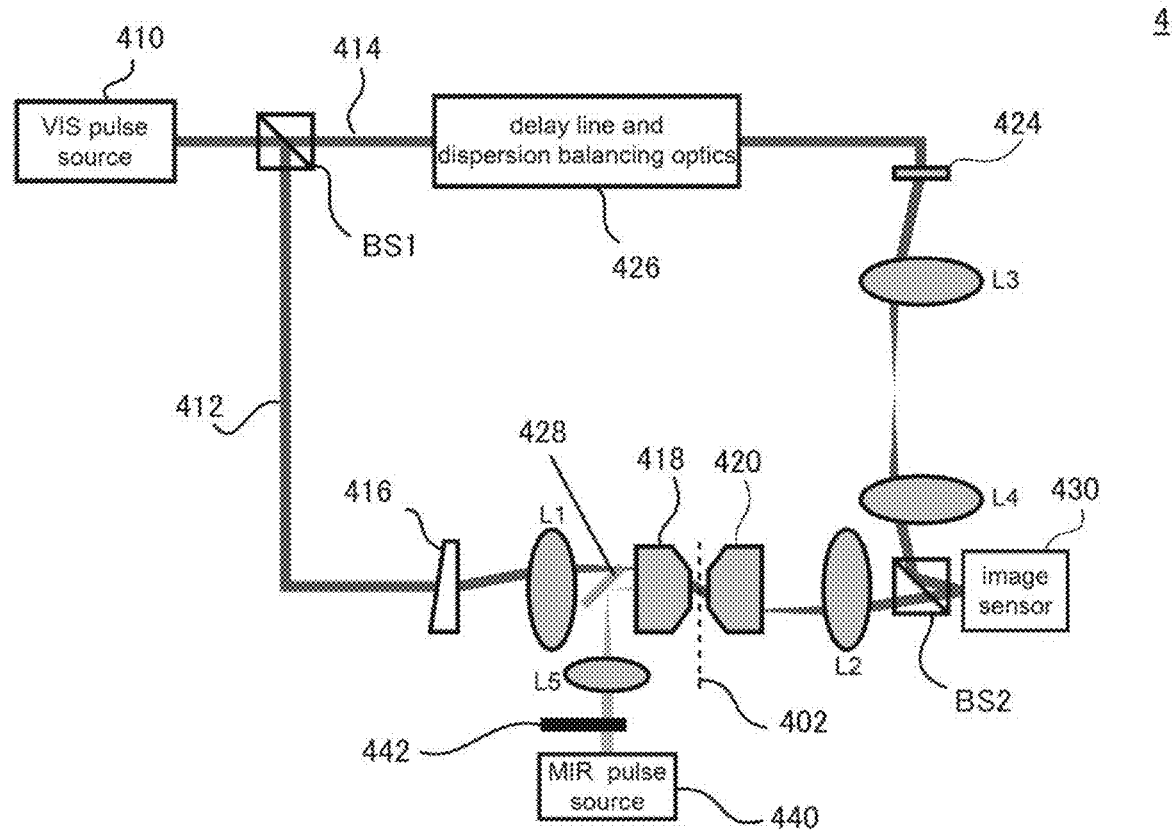
FIG. 23 is a block diagram showing a configuration of an image generating apparatus according to a fourth embodiment.

FIG. 23 is a block diagram showing a configuration of an image generating apparatus 4 according to a fourth embodiment. The image generating apparatus 4 is configured as a three-dimensional refractive index microscope.

A pulsed visible light source 410 generates visible light laser pulses with a pulse width of several hundred ns or less. The visible light laser pulses are irradiated as a collimated light laser beam. The visible light laser beam is split by a beam splitter BS1 to a sample arm 412 and a reference arm 414.

The laser beam split to the sample arm 412 passes through a rotatable wedge prism 416, which deflects the laser beam, thereby providing an oblique light path. Subsequently, the laser beam thus deflected passes through a lens L2 and a reflection objective lens 418, and is irradiated to a sample 402 with an oblique incident angle (with a non-zero incident angle).

By rotating the wedge prism 416, this arrangement allows the incident angle to be changed such that its azimuth angle is scanned. The beam that has passed through the sample 402 is collected by a transmission objective lens 420. Subsequently, an image of the sample 402 mounted on a sample face is formed on an image sensor 430 by means of the transmission objective lens 420 and the lens L2 arranged as a downstream component. On the other hand, the beam split to the reference arm 414 passes through lenses L3 and L4 such that an image of a grating 424 arranged in front of the lens L3 is formed on the image sensor 430. In this stage, the diffracted light generated by the grating 424 is blocked except for the 1st order diffracted light. The difference in the time delay and the time dispersion between the sample arm 412 and the reference arm 414 defined between the beam splitters BS1 and BS2 is corrected by means of a delay line/dispersion balance optical system 426 arranged on the reference arm 414.

The light that passes through the sample arm 412 and the light that passes through the reference arm 414 are coupled by the beam splitter BS2, and are superimposed on the image sensor 430, which generates an interference image. The interference image thus generated is detected by the image sensor 430 in the form of an image. By applying calculation processing to the interference image thus obtained, this arrangement is capable of acquiring a complex amplitude image of the sample 402.

By acquiring the complex amplitude image while rotating the wedge prism 416, this arrangement is capable of acquiring complex amplitude images of the sample 402 with irradiation light at different azimuth angles. A calculator estimates a three-dimensional refractive index distribution of the sample 402 based on the complex amplitude images according to the principles of diffraction.

On the other hand, the pulsed mid-infrared light source 440 generates mid-infrared laser pulses with a pulse width of several hundred ns or less. The mid-infrared laser pulses thus generated are irradiated to the sample 402 via a lens L5 and a reflective objective lens 418, which induces the photothermal effect in a molecular vibration selective manner. Furthermore, a dichroic mirror 428 configured to allow visible light to pass through and to reflect mid-infrared light is employed. This allows the two laser beams to be coupled. The difference in the three-dimensional refractive index distribution image between a state in which excitation occurs due to the photothermal effect and a state in which such excitation does not occur is calculated. This arrangement is capable of quantifying the change in the refractive index due to the photothermal effect in a molecularly selective manner.

A synchronization chopper 442 may be inserted into the light path of the mid-infrared light. The synchronization method for the visible light pulse, the mid-infrared pulse, the image sensor 430, and the chopper 442 are the same as that employed in the image generating apparatus 3 shown in FIG. 18. Accordingly, the synchronization may be followed according to the time chart shown in FIG. 19.

[5.2] Results of Observation of Sample by Means of Image Generating Apparatus 4

Description will be made regarding the results obtained by measuring a sample by means of the image generating apparatus 4 shown in FIG. 23.

[5.2.1] Observation of Microbeads

In this example, the sample 402 to be employed was configured as porous silica beads each having a diameter on the order of 5 μm arranged such that they adhered to a calcium fluoride substrate and such that a space around each porous silica bead was filled with a contact liquid having a refractive index of 1.56, and which were mounted such that they were interposed between a pair of calcium fluoride substrates each having a thickness of 500 μm.

In order to provide the mid-infrared light, a pulsed light source configured to irradiate pulses of mid-infrared light with a wavenumber of 1045 cm$^{-1}$ and with a pulse width of 5 μs was employed. The mid-infrared light having such a wavelength resonates with the Si—O—Si vibration of silica. In order to provide the visible light, a pulsed light source configured to irradiate pulses of light with a wavelength of 532 nm and with a pulse width of 10 ns was employed. The mid-infrared light pulses and the visible light pulses were irradiated with a repetition rate of 1080 HZ. The image sensor 43 was operated with a frame rate of 60 Hz. The visible light was irradiated with a numerical aperture (NA) of 0.55 at nine azimuth angles. The visible light was focused with a NA of 0.85. The image integration was performed over 30 images. This arrangement requires a measurement period on the order of 20 s.

Figure 24A:
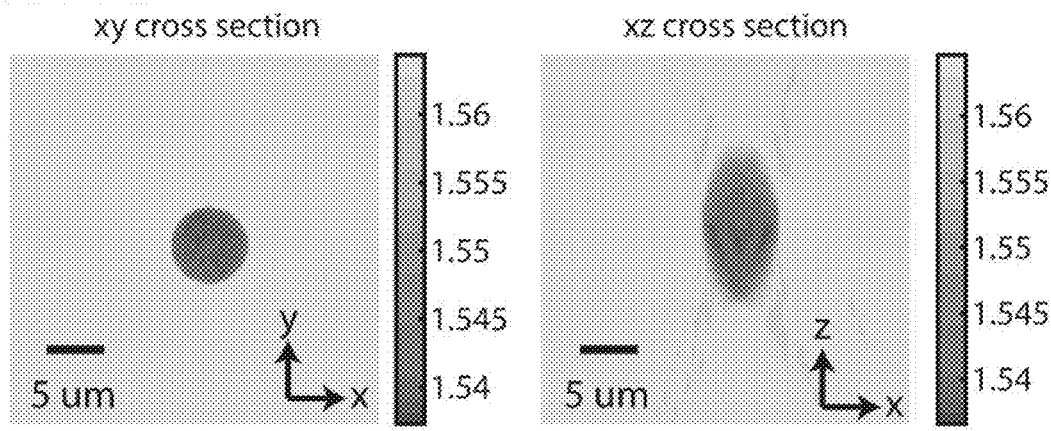
FIGS. 24A and 24B are diagrams showing measurement results with respect to microbeads obtained by the image generating apparatus shown in FIG. 23.
Figure 24B:
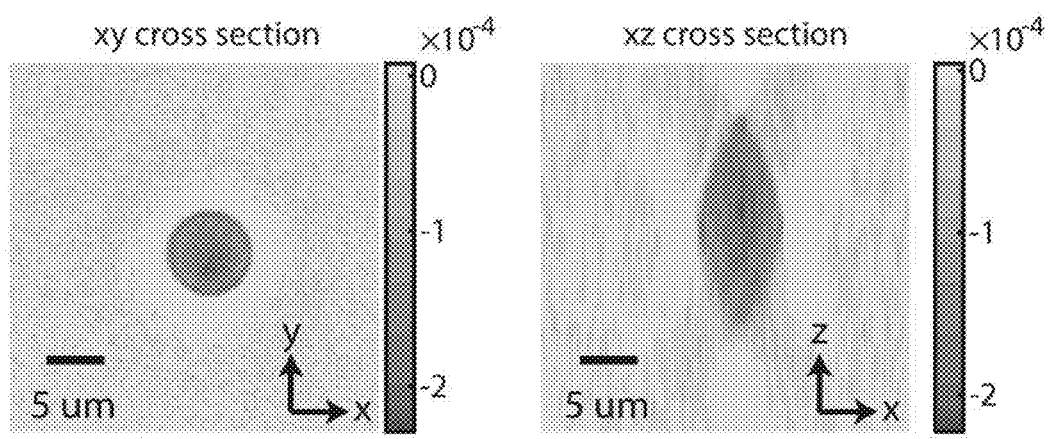

FIGS. 24A and 24B are diagrams showing the results of measurement of microbeads acquired by the image generating apparatus 4 shown in FIG. 23. FIG. 24A shows three-dimensional refractive index images of the sample 402 in the off state of the mid-infrared light. FIG. 24B shows three-dimensional distribution images of the change of the refractive index due to the photothermal effect. Specifically, the left-side image shows a cross-sectional image thereof that is orthogonal to the optical axis. The right-side image shows a cross-sectional image thereof that is parallel to the optical axis. It has been found that a change of the refractive index of approximately 0.0002 occurs, which corresponds to a change in temperature on the order of approximately 0.5 K.

What is claimed is:

1. A phase contrast microscope based on phase imaging, comprising:
    a stimulus input unit structured to irradiate a sample with stimulus input infrared light having a wavelength that resonates with an infrared absorption line of an observation target material included in the sample;
    a light source structured to generate irradiation light having a wavelength that is shorter than that of the stimulus input infrared light;
    an irradiation optical unit structured to irradiate a measurement area of the sample with the irradiation light, without scanning the sample with the irradiation light;
    a control unit structured to switch irradiation of the stimulus input infrared light input by the stimulus input unit between a first state and a second state;
    a detection unit including a phase film, an image sensor and an image generating processing unit, wherein the phase film is configured to apply phase shift to a 0th order diffracted light included in the irradiation light that has passed through the measurement area of the sample, and the image sensor is provided to detect an interference image between the 0th order diffracted light and a higher-order diffracted light included in the irradiation light that has passed through the measurement area of the sample, and wherein the image generating processing unit is structured to generate an image indicative of a phase distribution of the measurement area of the sample based on the output of the image sensor, and wherein the image generating processing unit generates a first image in the first state and a second image in the second state; and a generating unit structured to generate an output image that represents a property of the measurement area of the sample according to the first image and the second image, wherein the generating unit calculates a difference and/or a ratio of corresponding pixels between the first image and the second image, and wherein the generating unit generates the output image based on the difference and/or the ratio of the corresponding pixels between the first image and the second image.

2. The image generating apparatus according to claim 1, wherein, in the first state, the stimulus input infrared light is on, and wherein, in the second state, the stimulus input infrared light is off.

3. The image generating apparatus according to claim 1, wherein the stimulus input unit is structured to be capable of changing a wavelength of the stimulus input infrared light.

4. The image generating apparatus according to claim 1, wherein there is a difference in an intensity of the stimulus input infrared light between the first state and the second state.

5. The image generating apparatus according to claim 1, wherein there is a difference in a wavelength of the stimulus input infrared light between the first state and the second state.

6. The image generating apparatus according to claim 1, wherein the detection unit is provided at a position such that it faces the sample, and wherein the detection unit further comprises an objective lens structured to magnify a part of an image of the sample.

7. An image generating method based on phase imaging for generating an image of a sample, comprising:

irradiating a sample with a stimulus input infrared light having a wavelength that resonates with an infrared absorption line of an observation target material included in the sample, and switching a state of the stimulus input infrared light between a first state and a second state;

irradiating a measurement area of the sample with irradiation light having a wavelength that is shorter than that of the stimulus input infrared light at the same time as the irradiation of the stimulus input infrared light, without scanning the sample with the irradiation light;

providing a phase film configured to apply phase shift to a 0th order diffracted light included in the irradiation light that has passed through the measurement area of the sample;

providing an image sensor configured to detect an interference image between the 0th order diffracted light and a higher-order diffracted light included in the irradiation light that has passed through the measurement area of the sample;

generating a first image indicative of phase distribution of the measurement area of the sample based on the output of the image sensor in the first state;

generating a second image indicative of the phase distribution of the measurement area of the sample based on the output of the image sensor in the second state;

calculating a difference and/or a ratio of corresponding pixels between the first image and the second image, and generating an image of the sample based on the difference and/or the ratio of the corresponding pixels between the first image and the second image; and generating an output image that represents a property of the measurement area of the sample according to the first image and the second image.

8. The image generating apparatus according to claim 1, wherein the image generating apparatus is a phase contrast microscope.

9. The image generating apparatus according to claim 1, wherein the image generating apparatus is a digital holographic microscope.

10. The image generating apparatus according to claim 1, wherein the image generating apparatus is a differential interference microscope.

* * * * *